United States Patent [19]
Nishizaki et al.

[11] Patent Number: 5,826,677
[45] Date of Patent: Oct. 27, 1998

[54] VEHICLE STEERING DEVICE

[75] Inventors: Katsutoshi Nishizaki, Nabari; Yoshihiro Goto, Kashiwara; Tomoyasu Kada, Higashiosaka; Shiro Nakano, Osaka; Yoshinobu Shimizu, Sakai, all of Japan

[73] Assignee: Koyo Seiko Co., Ltd., Osaka, Japan

[21] Appl. No.: 629,396

[22] Filed: Apr. 8, 1996

[30] Foreign Application Priority Data

Apr. 18, 1995 [JP] Japan ..................... 7-117868
Nov. 10, 1995 [JP] Japan ..................... 7-317210

[51] Int. Cl.⁶ .................................................. B60R 21/00
[52] U.S. Cl. ..................... 180/421; 180/169; 180/446; 701/41
[58] Field of Search ..................... 180/169, 421, 180/422, 446; 701/41, 42, 117

[56] References Cited

U.S. PATENT DOCUMENTS

| | | | |
|---|---|---|---|
| 4,119,172 | 10/1978 | Yanagishima et al. | 180/421 |
| 5,078,226 | 1/1992 | Inagaki et al. | 180/422 |
| 5,159,553 | 10/1992 | Karnopp et al. | 180/422 |
| 5,373,911 | 12/1994 | Yasui | 180/422 |
| 5,418,723 | 5/1995 | Reichelt et al. | 180/422 |
| 5,446,657 | 8/1995 | Ikeda et al. | 180/446 |
| 5,667,033 | 9/1997 | Shimizu et al. | 180/446 |
| 5,684,700 | 11/1997 | Crocker | 180/422 |

FOREIGN PATENT DOCUMENTS

| | | |
|---|---|---|
| 2-291099 | 11/1990 | Japan . |
| 3-96439 | 4/1991 | Japan . |
| 2-125142 | 1/1992 | Japan . |
| 4-19274 | 1/1992 | Japan . |
| 7-47967 | 2/1995 | Japan . |
| 6-141339 | 1/1996 | Japan . |

*Primary Examiner*—Daniel G. DePumpo
*Attorney, Agent, or Firm*—Thelen Reid & Priest LLP

[57] ABSTRACT

A vehicle steering device has a steering inhibition portion that enables the steering device to be switched between a steering inhibition application mode and a steering inhibition release mode—regardless of whether or not the vehicle is being steered by a driver. This arrangement avoids the need to determine whether or not the vehicle is being steered before determining whether or not to inhibit steering.

14 Claims, 19 Drawing Sheets

Fig. 4 (1)
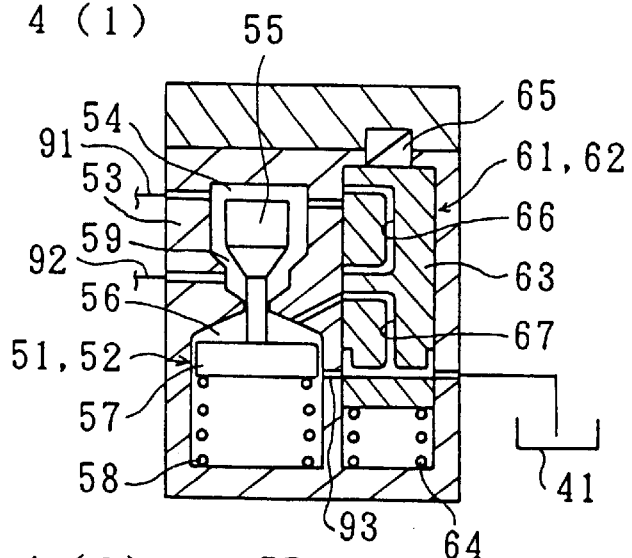
Fig. 4 (2)
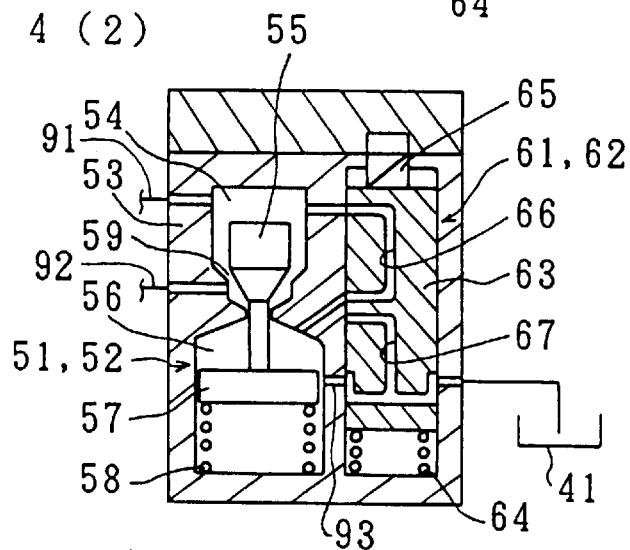
Fig. 4 (3)
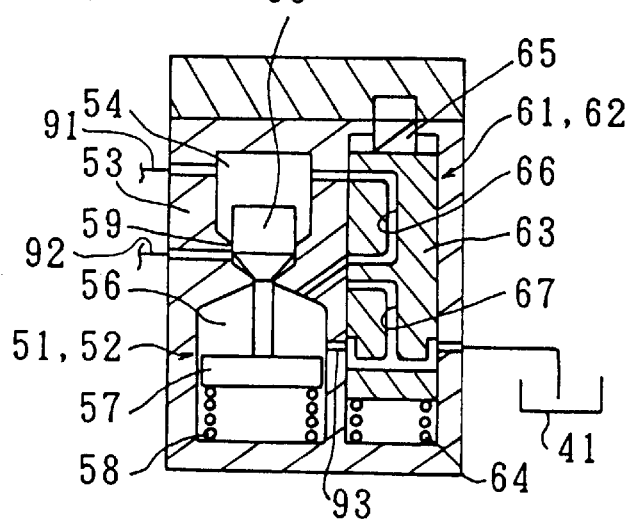

Fig. 8 (1)
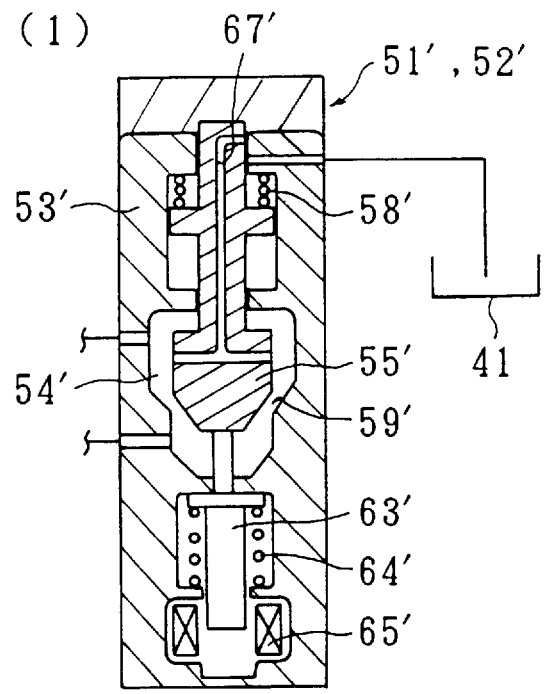
Fig. 8 (2)
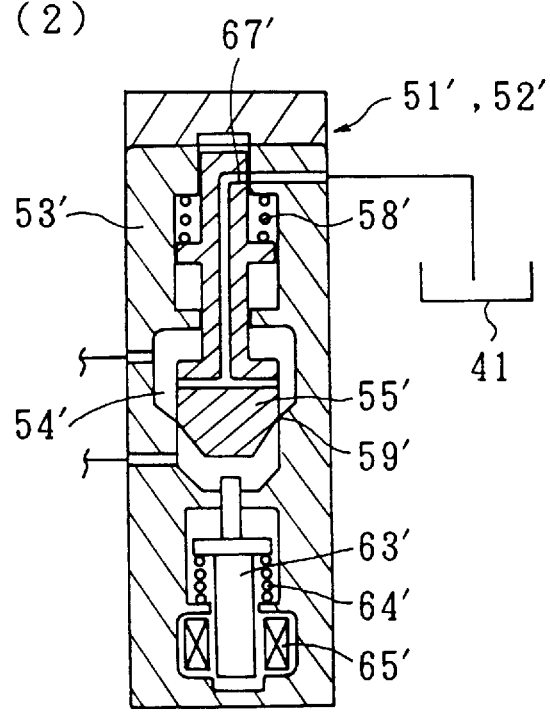

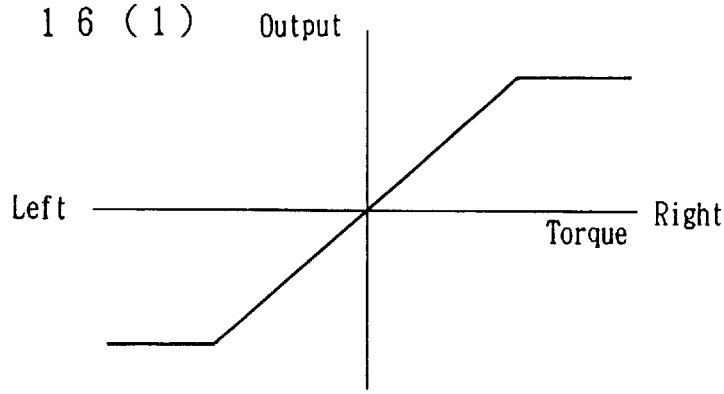
Fig. 16 (1)
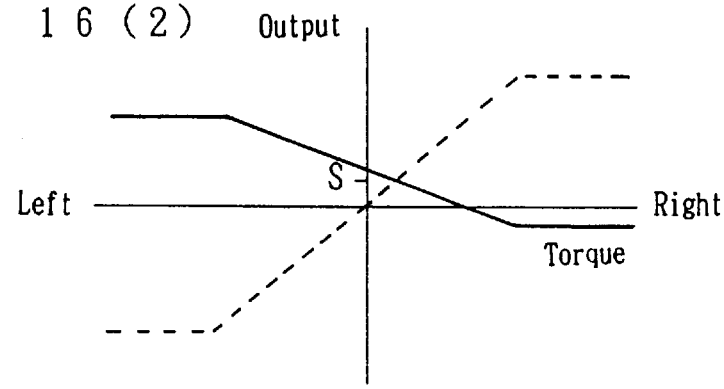
Fig. 16 (2)
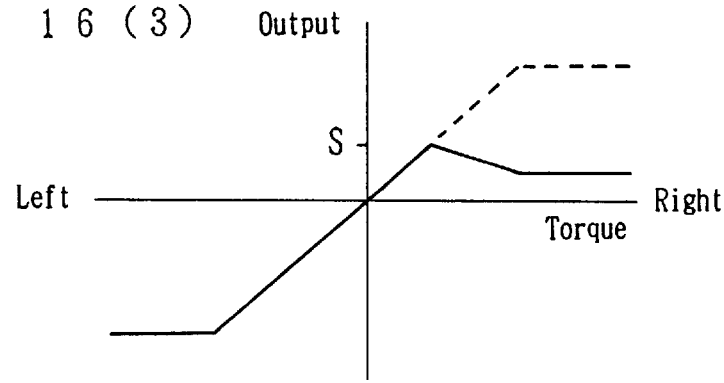
Fig. 16 (3)
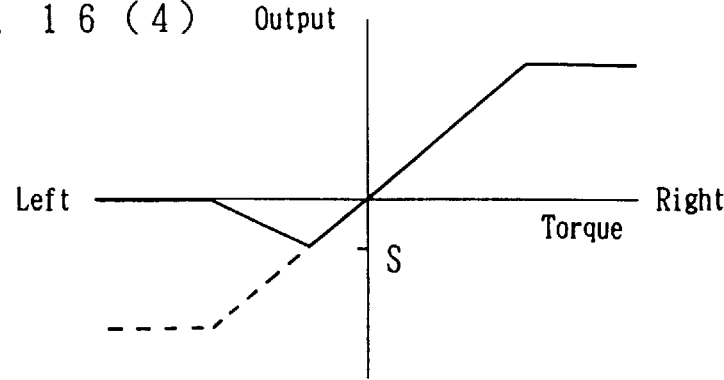
Fig. 16 (4)

VEHICLE STEERING DEVICE

FIELD OF THE INVENTION

The present invention relates to a steering device with the capacity to prevent a moving vehicle from leaving its current lane and colliding with an external obstacle such as another vehicle or a nearby crash barrier. The invention relates to a hydraulic or motor operated power steering device with the capacity to realize preventive safety in a situation in which the driver's vehicle is, for example, veering towards a nearby obstacle, by preventing the vehicle from being steered in the direction of the obstacle and by generating steering power to enable the vehicle to distance itself from the obstacle.

DESCRIPTION OF THE RELATED ART

One of the many dangerous situations which can arise in any moving vehicle is one in which the driver starts to change lane without realizing that there is another vehicle approaching diagonally to his/her rear. The concept of the so-called ASV (Advanced Safety Vehicle) is developed as a means for eliminating the sorts of dangers that can arise out of this sort of driver behavior and for preventing accidents. At the same time, however, little has so far been done to clarify how the dangers arising out of this sort of driver behavior is eliminated. Currently, for example, there are no specific proposals for a technology which can eliminate this sort of danger by controlling a hydraulic or motor operated power steering device.

There is a vehicle steering device incorporating a means for inhibiting the driver's steering behavior to prevent him/her from veering out of his/her current lane, and to prevent the sorts of collisions with nearby obstacles such as other vehicles or barrier rails during lane changing or the like.

Japanese patent laying open gazette H2-291099, for example, discloses a steering device which incorporates means for detecting the distance from the driver's vehicle to another nearby vehicle or to the side of the road, and means for detecting the direction in which the driver's vehicle is being steered, this device being used, in the event that the distance between the driver's vehicle and a nearby vehicle or the side of the road is too small, to provide the power necessary to inhibit the steering of the driver's vehicle.

Japanese patent laying open gazette H3-96439 discloses a steering device which incorporates means for detecting the steering angle and the strength of the driver's grip on the steering wheel to determine whether or not there is something abnormal condition of the driver, this device being used, in the event that abnormal driver condition is detected, to provide the power necessary to inhibit the vehicle's steering.

Japanese patent laying open gazette H7-47967 discloses a steering device which incorporates means for detecting obstacles in the vicinity of the driver's vehicle, means for detecting the steering direction, and means for determining the level of danger on the basis of the detection output of the previous two means, this device being used to inhibit the steering in accordance with the determined danger level.

Japanese patent laying open gazette H4-19274 discloses a hydraulic power steering device which has a hydraulic actuator with left and right hydraulic fluid chambers to provide steering assistance power and a control valve, the control valve being used to ensure a supply of high pressure fluid from the pump to one of the hydraulic fluid chambers while at the same time facilitating a reflux of low pressure fluid from the other hydraulic fluid chamber to the tank. This steering device also incorporates means for detecting an obstacle in the right rear and left rear of the driver's vehicle, and means for detecting the steering direction such that, in the event that there is an obstacle in the detected steering direction of the driver's vehicle, the high pressure fluid supply channel to the hydraulic actuator is bypassed to the low pressure side, thereby depriving the vehicle of its supply of steering assistance power. By cutting off the supply of steering assistance power in this way, the driver is warned of the presence of a nearby obstacle. An additional proposal included as part of this disclosure is that steering inhibition is effected by closing off the high pressure hydraulic fluid supply channel to the hydraulic actuator, or by closing off the low pressure fluid discharge channel from the actuator.

The abovementioned conventional steering devices detect not only the obstacles that necessitate the inhibition of steering but also the steering direction of the driver's vehicle, after which they generate the power required to carry out the steering inhibition. In other words, to determine whether or not to apply steering inhibition, these devices are required not only to confirm the presence of steering operation but also to determine the direction of steering. The problem is thus the inevitable complexity of the control system.

In the abovementioned conventional steering devices, the driver is warned of the presence of an obstacle by the withdrawal of the supply of steering assistance power. However, since the level of steering assistance power supplied while a vehicle is moving at high speed is already low, the reduction or withdrawal of this supply of assistance power cannot provide a reliable inhibition of the steering. There is thus a difficulty to warn the driver of the presence of a nearby obstacle. Moreover, since the level of steering inhibition is not matched to the strength of the driver's steering effort, there are times when the amount of steering inhibition is inadequate and equally times when it proves excessive.

Moreover, the only way used by conventional steering devices to warn a driver of the presence of a nearby obstacle is either to bypass the high pressure hydraulic fluid supply channel to the low pressure side of the hydraulic actuator, or to close off the actuator's high pressure fluid supply channel or its low pressure fluid drainage channel. The problem which arises here is that not only steering in the potential collision direction is inhibited but also steering away from the potential collision direction is inhibited.

To deal with the problem, it is considerable to provide a control system which incorporates means for detecting the steering direction, means for determining the likelihood of collision with an obstacle in the detected steering direction, and means for switching the direction in which steering inhibition is applied in response to the determination of the likelihood of collision. This would enable the application of steering inhibition to be confined to the direction in which there is an obstacle with which the driver's vehicle is in danger of colliding. Unfortunately, this approach necessitates the creation of a complicated control system.

In cases in which a vehicle is being driven along a narrow winding road, there is a danger that, if steering inhibition is applied, the vehicle finishes up careering off the road. Moreover, since the conventional devices can not determine the purpose of steering, for example, changing lanes, following a curve in the road, avoiding an obstacle ahead, or the like, therefore there is a risk that steering inhibition is applied in cases in which the driver is actually following a curve in the road or else veering to the side to avoid an obstacle ahead, and this result in the vehicle skidding off the road or else colliding with the obstacle ahead. To prevent this happening, it is suggested that steering inhibition is applied by reference to the degree of danger involved, but this necessitates the creation of an extremely complex and inordinately expensive control system.

COMPARATIVE EXAMPLES

One possible way, in which a vehicle can be prevented from getting into a dangerous situation by using a motor operated power steering device, which is controlled by software for the purpose of making the driving operation safer, is outlined below.

As shown in FIG. 18, a motor operated power steering device comprises a motor 531 for the generation of steering assistance power and a steering control unit 533 having a CPU 532 to control the drive current to the motor 531. Under normal control conditions, the torque voltage Tv, which is output by the torque sensor to indicate that the steering wheel is being used, and the vehicle velocity signal are used in conjunction with each other by the steering control unit 533 to determine and apply a suitable current to the motor 531. In this case, the CPU 532 of the steering control unit 533 uses a predetermined program to compute an appropriate value for the motor current based on the input torque voltage Tv and vehicle velocity signals.

In addition to the above elements, the steering control unit 533 also comprises a danger detection sensor 536 and a danger determination CPU 537. The danger detection sensor 536 can, for example, be made up of four separate infrared sensors or the like positioned at each of the four corners of the vehicle to send back signals to indicate that there is an obstacle in the vicinity of the driver's vehicle. The danger determination CPU 537 uses the signals received from the danger detection sensor 536 to determine the position of the obstacle with respect to the driver's vehicle, after which it generates the control signal necessary to prevent the driver's vehicle from getting any closer to the detected obstacle and transmit the signal to the steering control unit 533. On receipt of a signal from the danger determination CPU 537, the steering control unit 533 overwrites the motor current value recomputed by the CPU 532 on the basis of the signal received, and uses the overwritten motor current value to control the motor 531.

The configuration illustrated in FIG. 18 does, however, call for the determination of the vehicle's steering direction, and this makes the system unduly complex. Furthermore, to add this sort of control mechanism to existing power steering devices for the avoidance of dangerous situations, a radical improvement of the steering control units 533 of such existing power steering devices is required. Therefore, it is difficult to add the control mechanism for the avoidance of dangerous driving situations to existing motor operated power steering devices. One reason for this is that if the signal from the aforementioned danger determination CPU 537 is to be input to an existing steering control unit 533, this unit 533 have to be provided with an input port through which to receive the signal. In the absence of the input port, the signal from the danger determination CPU 537 cannot be input to the steering control unit 533. Again, if the CPU 532 in the steering control unit 533 is to be required to overwrite the motor current value with a new value based on signals received from the danger determination CPU 537, then the CPU 532 computation program is also going to need modifying.

For the reasons outlined above, it is not possible to use the existing type of steering control unit 533 without significant modification to manufacture the motor operated power steering device configured in the manner outlined above. It is thus necessary either to start from scratch and build up a completely new type of steering control unit or else to make large-scale modifications (such as reprogramming the CPU) to the existing steering control unit 533.

Under this circumstances, it is hoped to provide a motor operated power steering device, which can use the control unit that is supplied with existing motor operated power steering devices, which can be manufactured economically, and which has a safety control function that can be added to existing motor operated power steering devices.

It is the object of the present invention to provide a vehicle steering device that can resolve the problems outlined above.

SUMMARY OF THE INVENTION

The present invention is a vehicle steering device which comprises means for inhibiting the driver's steering; means for releasing the steering inhibition; and means for switching the steering device itself between a mode in which the steering inhibition can be applied and one in which the steering inhibition can be released, regardless of whether the vehicle is actually being steered or not. In other words, the steering device has the capacity to switch between a steering inhibition application mode and a steering inhibition release mode while the vehicle is actually being steered, it also has the capacity to switch between these same two modes when the vehicle is not being steered.

According to this configuration, the steering device of the present invention can determine whether or not to apply steering inhibition without the judgement that whether a steering operation is presence or absence and without the judgement of the direction of steering, and thus the control system can be significantly simplified.

It is desirable that the degree of steering inhibition is matched to the strength of the driver's steering effort in the vehicle steering device of the present invention.

According to this configuration, it is possible to carry out steering inhibition as necessary without making the control system overly complicated.

It is desirable that the vehicle steering device of the present invention comprises means for detecting a source calling for the application of steering inhibition in the right steering direction, and means for detecting a source calling for the application of steering inhibition in the left steering direction, and that the application of steering inhibition can be confined to steering in the direction in which the source is detected.

Therefore, the steering inhibition can be applied only with respect to steering in the direction in which such inhibition is needed, so that there is no need to switch the direction of the steering inhibition in accordance with the direction in which the vehicle is being steered. This makes it possible to create a simpler sort of control system.

It is desirable that the steering device of the present invention is provided with a vehicle velocity detection means and that, when the vehicle's velocity falls below a preset value, the steering device itself is switched to the mode in which the steering inhibition can be released. It is also desirable that the steering device is provided with a deceleration operation detection means, and that the steering device is switched to the mode in which the steering inhibition can be released, when a deceleration operation is carried out.

The effect of this is that the steering inhibition is not applied in a situation in which the driver is obliged to slow the vehicle down by a deceleration operation, for example, to negotiate a narrow, winding road, or to avoid an obstacle in the straight forward path of the vehicle. This prevents the vehicle from skidding off the road or from crashing into the obstacle in its path. While, when the vehicle is traveling at a velocity below the preset value or is decelerating, the driver has much more time to take avoiding action in the event that he/she encounters a possible collision scenario. There is thus no problem associated with the release of the steering inhibition under this sort of circumstance.

It is desirable that, the speed at which the steering inhibition is released is reduced in accordance with the strength of the driver's steering effort in the vehicle steering device of the present invention.

This prevents the vehicle from swerving following a sudden release of steering inhibition.

The preferred embodiment of the vehicle steering device of the present invention comprises a hydraulic actuator with a right hydraulic fluid chamber for the generation of steering assistance power to the right and a left hydraulic fluid chamber for the generation of steering assistance power to the left; a control valve which channels high pressure fluid from a pump into one of the hydraulic fluid chambers and drains low pressure fluid from the other hydraulic fluid chamber into a fluid tank, in accordance with the direction of steering and the strength of the driver's steering effort; means for detecting a source calling for the application of steering inhibition in the right steering direction; means for detecting a source calling for the application of steering inhibition in the left steering direction; means for issuing a right steering inhibition signal following the detection of the source calling for the application of steering inhibition in the right steering direction, and issuing a left steering inhibition signal following the detection of the source calling for the application of steering inhibition in the left steering direction; and means for applying steering inhibition by high pressure hydraulic fluid supplied via the control valve at a pressure in accordance with the strength of the driver's steering effort, in response to the right and/or left steering inhibition signal.

By applying steering inhibition by high pressure hydraulic fluid supplied via the control valve at a pressure commensurate with the strength of the driver's steering effort, it is possible to provide an appropriate level of steering inhibition without making the control system overly complicated.

The preferred embodiment of the steering device of the present invention comprises a hydraulic actuator with a right hydraulic fluid chamber for the generation of steering assistance power to the right and a left hydraulic fluid chamber for the generation of steering assistance power to the left; a control valve which channels high pressure fluid from a pump into one of the hydraulic fluid chambers and drains low pressure fluid from the other hydraulic fluid chamber into a fluid tank, in accordance with the direction of steering; means for detecting a obstacle with which the vehicle is in danger of colliding in the right steering direction; means for detecting a obstacle with which the vehicle is in danger of colliding in the left steering direction; a flow control valve for right steering inhibition located in the hydraulic fluid channel between the hydraulic actuator and the control valve;. a flow control valve for left steering inhibition located in the hydraulic fluid channel between the hydraulic actuator and the control valve; means for issuing a right steering inhibition signal following the detection of an obstacle with which the vehicle is in danger of colliding in the right steering direction, and issuing a left steering inhibition signal following the detection of the obstacle with which the vehicle is in danger of colliding in the left steering direction; means for operating the flow control valve for right steering inhibition such that the issue of the right steering inhibition signal results in a reduction in the flow of hydraulic fluid providing steering assistance power to the right; and means for operating the flow control valve for left steering inhibition such that the issue of the left steering inhibition signal results in a reduction in the flow of hydraulic fluid providing steering assistance power to the left; wherein the flow control valve for right steering inhibition is controlled such that it does not cause a reduction in the flow of hydraulic fluid for providing steering assistance power to the left, and the flow control valve for left steering inhibition is controlled such that it does not cause a reduction in the flow of hydraulic fluid for providing steering assistance power to the right.

The receipt of the right steering inhibition signal issued in response to the detection of a obstacle as a source calling for the application of steering inhibition in the right steering direction triggers one of the flow control valves for right steering inhibition, and then the one acts to reduce the flow of hydraulic fluid which flows to supply steering assistance power to the right between the hydraulic actuator's hydraulic fluid chambers and the control valves. This serves to reduce the activity of the hydraulic actuator and in so doing to apply steering inhibition to the right. Since the flow control valve is not act to reduce the flow of hydraulic fluid which flows to supply steering assistance power to the left between the hydraulic fluid chambers and the control valves, even if the right steering inhibition signal is generated, except when there is the left steering inhibition signal, there is no application of steering inhibition to the left.

The receipt of the left steering inhibition signal issued in response to the detection of a obstacle as a source calling for the application of steering inhibition in the left steering direction triggers the other of the flow control valves for left steering inhibition, and then the other acts to reduce the flow of hydraulic fluid which flows to supply steering assistance power to the left between the hydraulic actuator's hydraulic fluid chambers and the control valves. This serves to reduce the activity of the hydraulic actuator and in so doing to apply steering inhibition to the left. Since the other of the flow control valves is not act to reduce the flow of hydraulic fluid which flows to supply steering assistance power to the right between the hydraulic fluid chambers and the control valves, even if the left steering inhibition signal is generated, except when there is the right steering inhibition signal, there is no application of steering inhibition to the right.

The present configuration thus provides a simple way of confining the application of steering inhibition to the direction in which there is a danger of collision with a nearby obstacle and dispenses with the need for special purpose complex actuators.

It is desirable that the right steering inhibition signal is issued in response to the detection of the obstacle with which the vehicle is in danger of colliding in its right steering direction, and that the left steering inhibition signal is issued in response to the detection of the obstacle with which the vehicle is in danger of colliding in its left steering direction.

The adoption of this approach makes it possible to issue steering inhibition signals to operate each control valve in response to specific signals indicating the detection of individual obstacles. In other words, the present configuration dispenses with the need to switch the direction of application of steering inhibition in accordance with the steering direction in which the possibility of collision with an obstacle arises, instead applying steering inhibition to the direction in which the possibility of a collision arises simply by issuing a steering inhibition signal in response to the receipt of an obstacle detection signal. This simplifies the configuration of the control device for issuing the steering inhibition signals.

It is desirable that the control valve can channel high pressure hydraulic fluid to the hydraulic actuator at a pressure in accordance with the strength of the driver's steering effort, and that each flow control valve can reduce the flow of hydraulic fluid for the generation of steering assistance power in accordance with the pressure of the high pressure hydraulic fluid.

This enables the generation of steering assistance power to be matched to the strength of the driver's steering effort. In this case, in accordance with the pressure of the high pressure hydraulic fluid, the flow control valves reduce the flow of hydraulic fluid for providing steering assistance power, thereby the steering inhibition can be applied in line with the strength of the driver's steering effort. An appropriate level of steering inhibition can thus be applied without making the system unnecessarily complicated.

It is desirable that each of the flow control valves has a pressure sensitive chamber and a valve member that move in accordance with the pressure of the hydraulic fluid in the pressure sensitive chamber; that the means for operating each of the flow control valves has a hydraulic fluid channel switching valve; that each such switching valve connects the pressure sensitive chamber to the high pressure side in response to the steering inhibition signal, and connects the pressure sensitive chamber to the low pressure side by canceling of the steering inhibition signal; and that the flow of hydraulic fluid for the generation of steering assistance power is reduced in accordance with the movement of the valve member, which moves in accordance with the pressure in the pressure sensitive chamber.

By this configuration, it is possible to achieve steering inhibition in line with the strength of the driver's steering effort. It is also possible to release the steering inhibition by connecting the pressure sensitive chamber to the low pressure side of the control valve through the switching valve in response to the cancel of the steering inhibition signal. This significantly simplifies the configuration.

It is desirable that the steering device of the present invention comprises means for refluxing the high pressure hydraulic fluid supplied to one or other of the flow control valves to the low pressure side, when the one or other of the flow control valves is in operation and the flow of hydraulic fluid for the generation of steering assistance power is at its lowest.

When one or other of the flow control valves is in operation and the flow of hydraulic fluid for the generation of steering assistance power is at its lowest, the degree of the steering inhibition is at its highest. In this case, by refluxing the high pressure hydraulic fluid supplied to the one or other of the flow control valve back to the low pressure side, the hydraulic fluid pressure does not rise beyond the pump's relief pressure level. Thus, even when the driver is applying further steering effort despite the application of steering inhibition, it is possible to prevent the emergence of a problem due to the application of excessive fluid pressure.

It is desirable that the steering device of the present invention comprises a motor linked to a steering mechanism including a steering wheel, for the generation of steering assistance power when the steering wheel is turned; a drive control means which determines a target control value in accordance with input signals received and which uses the target control value to drive the motor; a sensor to detect the vehicle's running mode and issue a running mode signal; a danger prediction means which outputs a danger prediction signal in response to approach of the vehicle to an obstacle; and a danger avoidance safety control means connected to the sensor, the danger prediction means, and the drive control means; wherein the danger avoidance safety control means output the running mode signal from the sensor to the drive control means without modification, when the danger prediction signal from the danger prediction means is absent; and wherein the danger avoidance safety control means modifies the running mode signal from the sensor in accordance with the content of the danger prediction signal and then output the modified running mode signal to the drive control means on receipt of the danger prediction signal from the danger prediction means.

By adopting the above configuration, the sensor which outputs the running mode signal and the danger prediction means can be connected to the drive control means by way of the safety control means. The running mode signal issued by the sensor and the danger prediction signal issued by the danger prediction means are thus input first to the safety control means. In the absence of a danger prediction signal from the danger prediction means, the safety control means retransmits the running mode signal from the sensor without modification to the drive control means. On the other hand, when a danger prediction signal is input from the danger prediction means, the safety control means modifies the running mode signal from the sensor in accordance with the content of the danger prediction signal, and then inputs the modified running mode signal to the drive control means.

Thus, if a steering control unit currently used in an existing motor operated power steering device is used as the drive control means without modification, all the safety control means needs to do is to modify the running mode signal so as to be able to avoid a danger when danger is predicted. In other words, an existing drive control means (steering control unit) can be used without modification to configure a motor operated power steering device with the capacity for danger avoidance control.

It is desirable that the danger prediction signal indicating the direction of a detected obstacle in relation to the driver's vehicle, and that the safety control means converts the running mode signal received from the sensor into an another running mode signal corresponding to the target control value for inhibiting the driver's vehicle from traveling in the direction of the detected obstacle.

Since the steering device of the present invention is not required to confirm the presence of steering operation and to judge the direction of steering to determine whether or not to apply steering inhibition, the control system can be significantly simplified. By making the degree of steering inhibition correspond to the strength of the driver's steering effort, a suitable degree of steering inhibition can be achieved without necessitating the configuration of an overly complicated control system. Rather than switching the direction of steering inhibition to match the steering direction, the steering inhibition can be applied only in the direction in which it is required. This in turn enables the control system to be significantly simplified. By switching to steering inhibition release mode when the vehicle's velocity falls below the preset value or else when the deceleration operation is carried out, the vehicle can be prevented from skidding off course or else from crashing into an obstacle in its path. By reducing the speed, at which steering inhibition is released, in accordance with the strength of the driver's steering effort, it is also possible to prevent the vehicle from swerving following a sudden release of the steering inhibition.

In a hydraulic power steering device of the present invention, steering inhibition effort is generated by high pressure fluid at a pressure commensurate with the strength of the driver's steering effort with the help of the hydraulic control valve, thereby enabling a satisfactory level of steering inhibition to be achieved without unnecessarily complicating the control system. Moreover, a simple configuration without a special purpose actuator is all that is needed to enable the application of steering inhibition to be confined to the steering direction in which there is a possibility of collision with a obstacle. This in turn enables the configuration of the controller which outputs the steering inhibition signal to be simplified as well. Furthermore, the occurrence of problems associated with the use of an excessive level of hydraulic pressure can also be avoided.

Furthermore, according to the present invention, by the controller from the steering control unit of the existing motor operated power steering devices without further modification, a safety control steering function for the avoidance of danger can be added to a motor operated power steering device. Since the controller from the existing steering control unit can be used in this way, it is possible to configure a full motor operated power steering device at a very reasonable cost. A danger avoidance safety control function can also be added quite easily to the existing motor operated power steering device.

BRIEF DESCRIPTION OF THE DRAWINGS

FIG. 4(1): An explanatory diagram illustrating the steering inhibition release operation of the flow control valve of the first embodiment of the invention.

FIG. 4(2): An explanatory diagram illustrating the steering inhibition operation of the flow control valve of the first embodiment of the invention.

FIG. 4(3): An explanatory diagram illustrating the point of maximum steering inhibition of the flow control valve of the first embodiment of the invention.

FIG. 8(1): An explanatory diagram illustrating the steering inhibition release operation of the flow control valve of the fourth embodiment of the invention.

FIG. 8(2): An explanatory diagram illustrating the steering inhibition operation of the flow control valve of the fourth embodiment of the invention.

FIG. 16(1): Diagram illustrating the relationship between steering torque and driver circuit output in the steering assistance power mode of the motor operated power steering device of the eight embodiment of the invention.

FIG. 16(2): Diagram illustrating the relationship between steering torque and driver circuit output in the left/right steering inhibition mode of the motor operated power steering device of the eight embodiment of the invention.

FIG. 16(3): Diagram illustrating the relationship between steering torque and driver circuit output in the right steering inhibition mode of the motor operated power steering device of the eighth embodiment of the invention.

FIG. 16(4): Diagram illustrating the relationship between steering torque and driver circuit output in the left steering inhibition mode of the motor operated power steering device of the eighth embodiment of the invention.

DETAILED DESCRIPTION OF THE PREFERRED EMBODIMENTS

There follows a description of the first preferred embodiment of the invention by reference to FIGS. 1 to 4.

Figure 1:
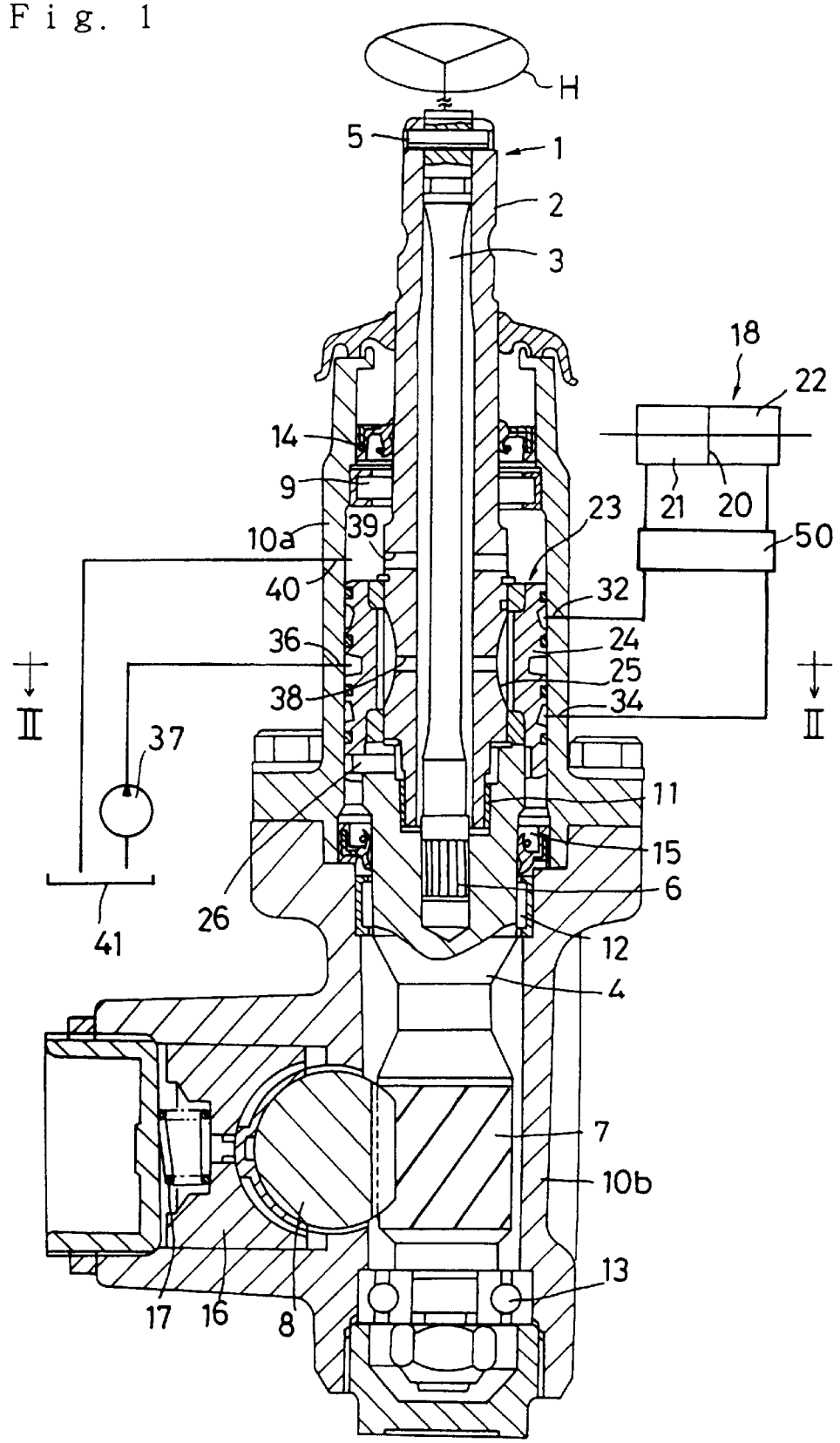
FIG. 1: A vertical cross sectional view of the hydraulic power steering device of the first embodiment of the invention.

The rack and pinion hydraulic power steering device 1 shown in FIG. 1 incorporates an input shaft 2 connected to a steering wheel H and an output shaft 4 connected to the input shaft 2 by way of a torsion bar 3. The torsion bar 3 is connected to the input shaft 2 by a pin 5 and to the output shaft 4 by serrations 6. There is a pinion 7 on the output shaft 4. The ends of a rack 8, which meshes with said pinion 7, are connected to the road wheel which is to be steered (omitted from the drawing). The input shaft 2 is supported by a valve housing 10a by way of a bearing 9 and by the output shaft 4 by way of a bush 11. The output shaft 4 is supported by the rack housing 10b by way of two bearings 12,13.

With the help of this configuration, rotation of the input shaft 2 caused by steering the steering wheel H is transmitted to the pinion 7 by way of the torsion bar 3. Rotation of the pinion 7 causes the rack 8 to move in its longitudinal direction. This movement of the rack 8 causes the road wheel to turn.

Oil seals 14, 15 are introduced between the input and output shafts 2,4 and the valve housing 10a. The rack 8 is supported by a support yoke 16 which is pressed against the rack 8 by the elastic force of a spring 17.

A hydraulic cylinder 18 is set up to act as a hydraulic actuator for the generation of steering assistance power. The hydraulic cylinder 18 incorporates a cylinder tube made up of the rack housing 10b, a piston 20 which is integrated with the rack 8, and a right hydraulic fluid chamber 21 for the generation of steering assistance power to the right and a left hydraulic fluid chamber 22 for the generation of steering assistance power to the left, which are separated from each other by the pinion 20.

The hydraulic fluid chambers 21,22 of the hydraulic cylinder 18 are connected to a rotary type hydraulic control valve 23 by way of a steering inhibition mechanism 50, which is described in more detail below. The control valve 23 incorporates a cylinder shaped first valve member 24 and a second valve member 25, which is inserted in the first valve member 24 such that it is able to rotate relative to the first valve member 24. The first valve member 24 is fitted to the output shaft 4 with the help of a pin 26 such that it is able to rotate together with the output shaft 4. The second valve member 25 is formed as an integral part of the outer circumference of the input shaft 2.

Figure 2:
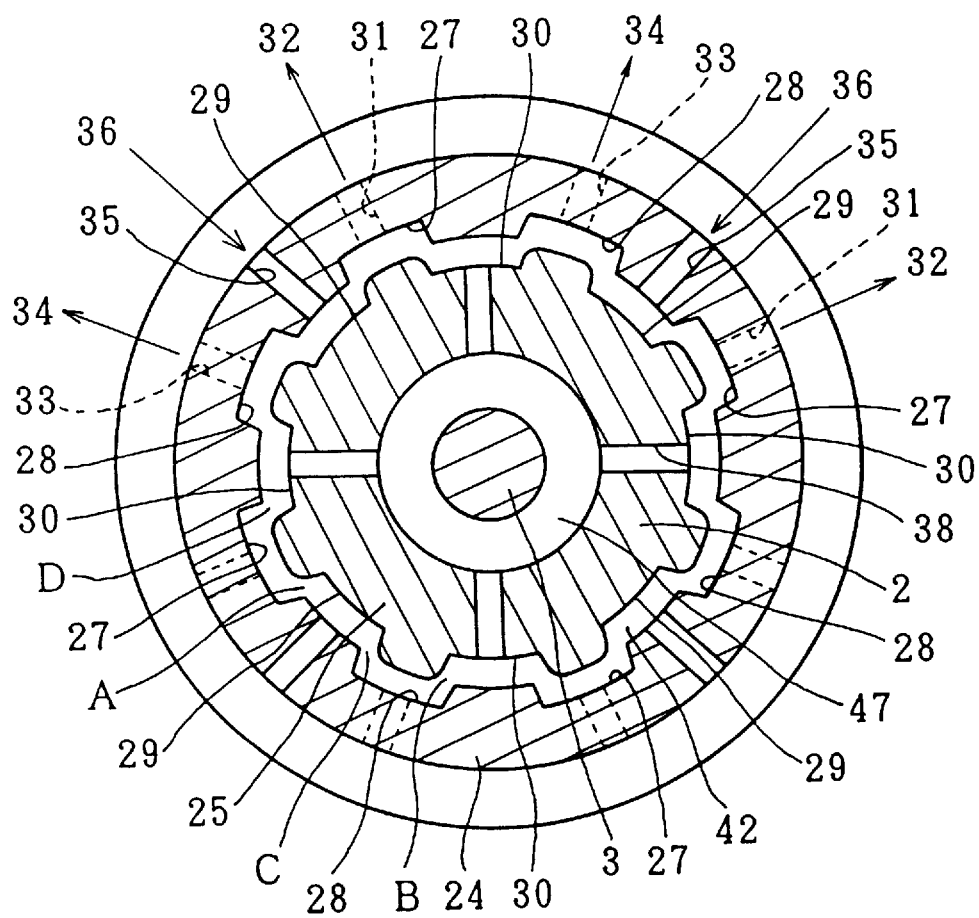
FIG. 2: A cross section taken substantially on line II—II of FIG. 1.

As shown in FIG. 2, a plurality of axially oriented slots are formed at intervals around the inner circumference of the first valve member 24 and the outer circumference of the second valve member 25. The slots around the inner circumference of the first valve member 24 comprise four equally spaced right steering slots 27 and four equally spaced left steering slots 28. The slots around the outer circumference of the second valve member comprise four equally spaced hydraulic fluid feed slots 29 and four equally spaced hydraulic fluid drainage slots 30. The right steering slots 27 and the left steering slots 28 are positioned alternately around the inner circumference of the first valve member 24. The hydraulic fluid feed slots 29 and the hydraulic fluid drainage slots 30 are positioned alternately around the inner circumference of the second valve member 25.

Each of the right steering slots 27 communicate with the right hydraulic fluid chamber 21 by way of first flow channels 31, which are formed in the first valve member 24, a first port 32, which is formed in the valve housing 10a, and the steering inhibition mechanism 50. Each of the left steering slots 28 communicate with the left hydraulic fluid chamber 22 by way of second flow channels 33, which are formed in the first valve member 24, a second port 34, which is formed in the valve housing 10a, and the steering inhibition mechanism 50. The hydraulic fluid feed slots 29 communicate with a pump 37 as shown in FIG. 1 by way of third flow channels 35, which are formed in the first valve member 24, and an intake port 36, which is formed in the valve housing 10a. The hydraulic fluid drainage slots 30 communicate with a tank 41 by way of first drainage channels 38, which are formed in the second valve member 25, channels 47 formed by the gap between the inner and outer circumferences of the input shaft 2 and the torsion bar 3, second drainage channels 39, which are formed in the input shaft 2 as shown in FIG. 1, and a drainage ports 40, which is formed in the valve housing 10a. A relief valve (omitted from the drawing) is also fitted to provide protection for the pump 37.

When steering inhibition is not in progress, the pump 37, the tank 41 and the two hydraulic fluid chambers 21,22 are communicated with each other through the internal flow channel 42 formed between the inner and outer circumferences of the first and second valve members 24,25. In the internal channel 42 of the control valve 23, the gaps between the first and second valve member slots form throttling areas A, B, C and D. The gap size, that is, the opening of the throttling areas A, B, C and D can be varied by rotating the first and second valve members 24,25 relative to each other. The pressure of the fluid acting on the hydraulic cylinder 18 is varied by varying the opening of the throttling areas A, B, C and D.

FIG. 2 shows the relative positions of the first and second valve members 24,25 when the vehicle is on a straight course and steering is not being carried out. In this condition, the hydraulic fluid feed slots 29 and the hydraulic fluid drainage slots 30 are communicated to each other by way of fully opened throttling areas A, B, C and D, so that the fluid supplied from the pump 37 is drained straight back into the tank 41. There is thus no steering assistance power generated.

If the driver then steers the vehicle away from its straight course to the right, the torsion bar 3 is twisted as a result of the torque corresponding to the strength of the driver's steering effort. This twisting motion in turn causes the two valve members 24,25 to rotate relative to each other. As a result, there is an increase in the opening of the throttling areas A between the right steering slots 27 and the hydraulic fluid feed slots 29 and the opening of the throttling areas B between the left steering slots 28 and the hydraulic fluid drainage slots 30, and there is a decrease in the opening of the throttling areas C between the left steering slots 28 and the hydraulic fluid feed slots 29 and the opening of the throttling areas D between the right steering slots 27 and the hydraulic fluid drainage slots 30. Thus, when steering inhibition is not being applied, high pressure fluid is fed at a pressure corresponding to the strength of the driver's steering effort from the pump 37 into one hydraulic fluid chamber 21 and low pressure fluid is at the same time drained back out of the other hydraulic fluid chamber 22 into the tank 41. As a result, steering assistance power to assist in steering the vehicle to the right is applied to the rack 8.

If the driver steers the vehicle away from a straight course to the left, the opening of the throttling areas A, B, C and D is varied in the opposite direction to that which applied when the vehicle is steered to the right. Thus, when the steering is not being inhibited, steering assistance power to assist in steering the vehicle to the left is applied to the rack 8.

Figure 3:
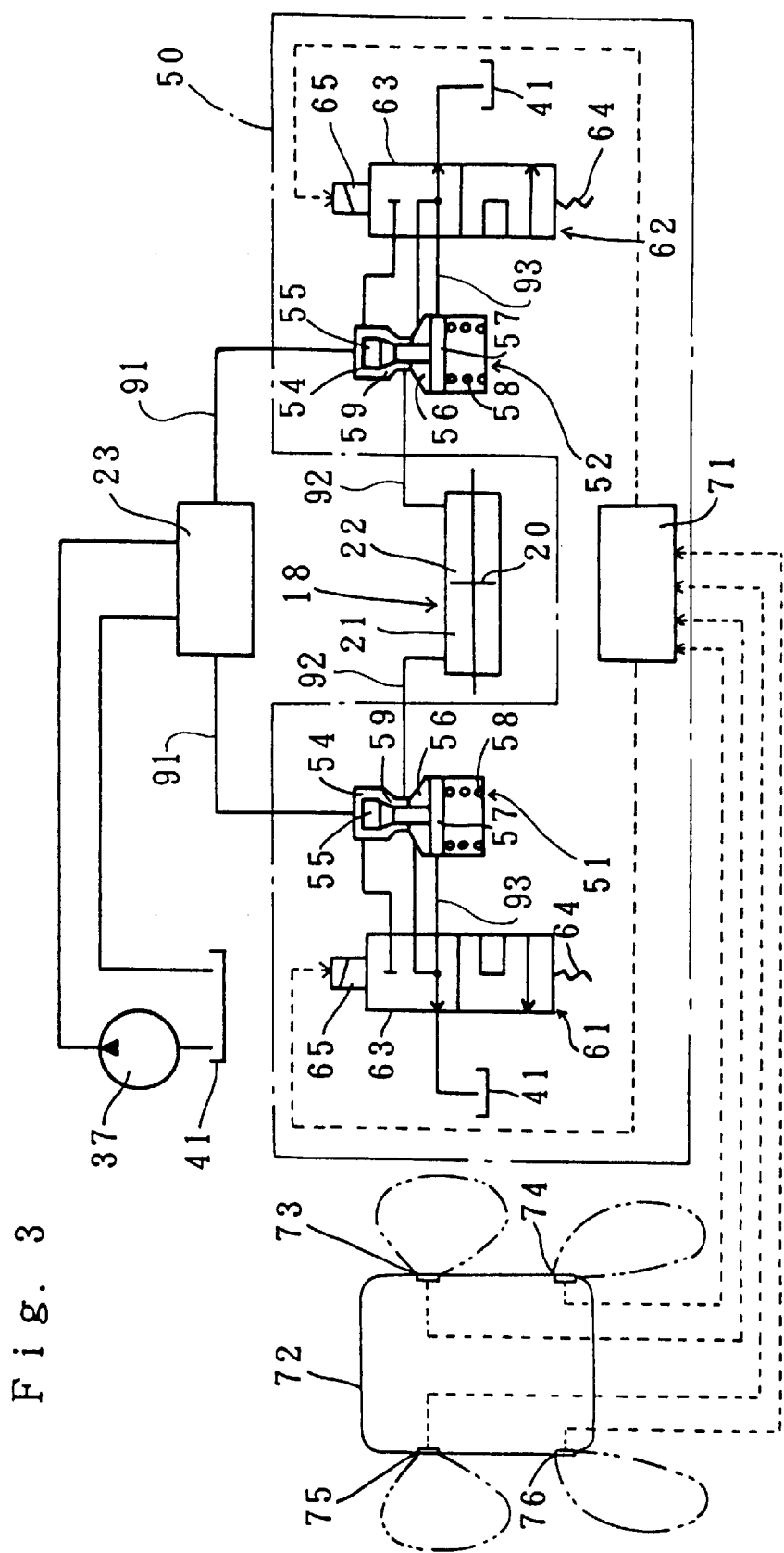
FIG. 3: A schematic diagram illustrating the configuration of the hydraulic power steering device of the first embodiment of the invention.

As shown in FIG. 3, the steering inhibition mechanism 50 has a first flow control valve 51 for right steering inhibition and a second flow control valve 52 for left steering inhibition. The first flow control valve 51 is incorporated into the hydraulic fluid channel between the right hydraulic fluid chamber 21 and the rotary type hydraulic control valve 23. The second flow control valve 52 is incorporated into the hydraulic fluid channel between the left hydraulic fluid chamber 22 and the rotary type hydraulic control valve 23.

As shown in FIG. 3 and FIG. 4(1), 4(2) and 4(3), each of the two flow control valves 51, 52 has a housing 53, a valve chamber 54 incorporated into the housing 53, a valve member 55 contained within the valve chamber 54, a pressure sensitive chamber 56 formed within the housing 53, a pressure sensitive member 57 contained within the pressure sensitive chamber 56, and a compression coil spring 58 within the pressure sensitive chamber 56.

The valve member 55 and the pressure sensitive member 57 are made in the form of a single unit, which is normally held in position in the upper part of the drawing by the elastic force exerted by the spring 58.

The valve chamber 54 of the first flow control valve 51 is connected by a hydraulic fluid channel 91 to the right steering slots 27 of the control valve 23 and to the right hydraulic fluid chamber 21 by a hydraulic fluid channel 92. The valve chamber 54 of the second flow control valve 52 is connected by a hydraulic fluid channel 91 to the left steering slots 28 of the control valve 23 and to the left hydraulic fluid chamber 22 by a hydraulic fluid channel 92. Each of the two flow control valves 51,52 has a throttling area 59 which reduces the opening between the control valve 23 and the hydraulic cylinder 18 in accordance with the downward movement of the valve member 55 as shown in the Figure. The throttling areas 59 are normally fully open.

A first solenoid switching valve 61 is connected to the first flow control valve 51. A second solenoid switching valve 62 is connected to the second flow control valve 52. Each of the two switching valves 61,62 incorporate the housing 53 of the flow control valves 51,52. Each of the switching valves 61,62 has a spool 63, which is inserted into the housing 53 such that it can move up and down as shown in the figure, a compression coil spring 64 located below the spool 63, and a solenoid 65. Each spool 63, which is provided with a connecting fluid channel 66 and a bypass fluid channel 67, is normally pressed into the upper part as shown in the figure by the elastic force of the spring 64.

FIG. 4(1) illustrates a condition in which the solenoid 65 is not excited. In this condition, the spool 63 is positioned towards the top as shown in the figure such that each of the switching valves 61,62 is connecting the pressure sensitive chamber 56 to the tank 41, that is, to the low pressure side by way of the bypass hydraulic fluid channel 67.

FIGS. 4(2) and 4(3) illustrate a condition in which the solenoid 65 is in a state of excitation. In this condition, the spool 63 is positioned towards the bottom as shown in the figure such that each of the two switching valves 61,62 is connecting the pressure sensitive chamber 56 with the valve chamber 54 by way of the connecting fluid channel 66.

FIG. 4(3) illustrates a condition in which the valve member 55 is in its lowest position as shown in the figure. In this condition, the throttling area 59 is completely closed, and thus the valve chamber 54 is connected to the low pressure side, that is, to the tank 41 by way of the connecting fluid channel 66, the pressure sensitive chamber 56, a hydraulic fluid channel 93, and the bypass hydraulic fluid channel 67. In conditions other than this, the inlet of the bypass fluid channel 67 is closed by closing the fluid channel 93 with the pressure sensitive member 57, as shown in FIGS. 4(1) and 4(2).

As shown in FIG. 3, the solenoids 65 of the two switching valve 61,62 are connected to a controller 71. The controller 71 is connected to two right obstacle detection sensors 73,74 and two left obstacle detection sensors 75,76. The right obstacle detection sensors 73,74 are fitted to the body of the vehicle 72 for the purpose of detecting sources in the right steering direction that call for the application of steering inhibition. The sensors 75,76 detect obstacle such as other vehicles or crash barriers adjacent to the right and adjacent to the right rear of the driver's vehicle 72 as sources calling for the application of steering inhibition. The left obstacle detection sensors 75,76 are fitted to the body of the vehicle 72 for the purpose of detecting sources in the left steering direction that call for the application of steering inhibition. The sensors 75,76 detect obstacle such as other vehicles or crash barriers adjacent to the left and adjacent to the left rear of the driver's vehicle 72 as sources calling for the application of steering inhibition. Each of the obstacle detection sensors 73,74,75,76 has a transmitter, which emits radar waves such as ultrasonic waves from the vehicle and a receiver which detects the return of radar waves reflected back from nearby obstacles, the received radar waves being retransmitted to the controller 71 as potential collision obstacle detection signals. The controller 71 amplifies obstacle detection signals from the right obstacle detection sensors 73,74 to generate a solenoid drive current, which is issued to the solenoid 65 of the first solenoid switching valve 61 as a right steering inhibition signal. The controller 71 similarly amplifies obstacle detection signals from the left obstacle detection sensors 75,76 to generate a solenoid drive current, which is issued to the solenoid 65 of the second solenoid switching valve 62 as a left steering inhibition signal.

In the above configuration, if the vehicle is steered to the right at a point when there are no signals being transmitted from the obstacle detection sensors 73,74,75,76, high pressure fluid is pumped into the right hydraulic fluid chamber 21 from the pump 37 by way of the control valve 23, the valve chamber 54 of the first flow control valve 51, and the throttling area 59 of the first flow control valve 51, and low pressure fluid is drained away from the left hydraulic fluid chamber 22 into the tank 41 by way of the throttling area 59 of the second flow control valve 52, the valve chamber 54 of the second flow control valve 52, and the control valve 23, thereby making it possible to apply steering assistance power to assist the driver in steering to the right. Similarly, if the vehicle is steered to the left at a point when there are no signals being transmitted from the obstacle detection sensors 73,74,75,76, high pressure fluid is pumped into the left hydraulic fluid chamber 22 from the pump 37 by way of the control valve 23, the valve chamber 54 of the second flow control valve 52, and the throttling area 59 of the second flow control valve 52, and low pressure fluid is drained away from the right hydraulic fluid chamber 21 into the tank 41 by way of the throttling area 59 of the first flow control valve 51, the valve chamber 54 of the first flow control valve 51, and the control valve 23, thereby making it possible to apply steering assistance power to assist the driver in steering to the left.

The power steering device 1 described above can be switched between a mode in which the steering inhibition can be applied and a mode in which the steering inhibition can be released, regardless of whether or not the vehicle is being steered at the time. In other words, while the steering device 1 can be switched between the steering inhibition application mode and the steering inhibition release mode while the vehicle is being steered, it can also be switched between the same two modes when the vehicle is not steered.

To be more precise, in the event that an obstacle is detected by the right obstacle detection sensors 73,74 and an obstacle detection signal is received by the controller 71, the controller 71 then issues a right steering inhibition signal to the solenoid 65 of the first solenoid switch valve 61. As the solenoid 65 is excited, the spool 63 of the first solenoid switching valve 61 is moved into the lower position as shown in FIG. 4(2). The movement of the spool 63 has the effect of connecting the pressure sensitive chamber 56 to the valve chamber 54 by way of the connecting fluid channel 66 in the first flow control valve 51. The steering device 1 can thus be switched into the steering inhibition application mode, in which steering inhibition can be applied only to right steering. If the vehicle is steered to the right while in this condition, some of the high pressure fluid which is pumped from the control valve 23 into the valve chamber 54 is drawn into the pressure sensitive chamber 56 in the first flow control valve 51. As the high pressure fluid is drawn into the pressure sensitive chamber 56, the pressure sensitive member 57 moves downwards as shown in the figure to the point at which the pressure of the high pressure fluid and the elastic force of the spring 58 are in balance. As the pressure member 57 moves downwards, so the valve member 55 also moves downwards, thereby reducing the opening of the throttling area 59. By this operation of the first flow control valve 51, the flow of hydraulic fluid supplied from the control valve 23 to the right hydraulic fluid chamber 21 for the purpose of generating right steering assistance power is reduced. This in turn inhibits the movement of the hydraulic cylinder 18, that is, inhibits steering to the right. When the right steering inhibition signal is canceled, the spool 63 of the first solenoid switch valve 61 moves back up in response to the elastic force of the spring 64, as shown in FIG. 4(1). This movement has the effect of connecting the pressure sensitive chamber 56 of the first flow control valve 51 with the low pressure side. Thereby, the valve member 55 moves upwards in response to the elastic force of the spring 58 so that the opening of the throttling area 59 wider. The steering device 1 is in this way switched into the right steering inhibition release mode.

Similarly, if an obstacle is detected by the left obstacle detection sensors 75,76 and an obstacle detection signal is received by the controller 71, the controller 71 then issues a left steering inhibition signal to the solenoid 65 of the second solenoid switching valve 62. This excites the solenoid 65 and switches the steering device 1 into the steering inhibition application mode, in which steering inhibition can be applied only to left steering. If the vehicle is steered to the left while in this condition, it has the effect of operating the second flow control valve 52, so that the flow of hydraulic fluid supplied from the control valve 23 to the left hydraulic fluid chamber 22 for the purpose of generating left steering assistance power is reduced. This in turn inhibits the movement of the hydraulic cylinder 18, that is, inhibits steering to the left. If the left steering inhibition signal is canceled, the spool 63 of the second solenoid switching valve 62 moves upwards in response to the elastic force of the spring 64 as shown in the figure. This movement has the effect of switching the steering device 1 into the left steering inhibition release mode.

In the power steering device 1 outlined above, the steering inhibition is applied only to steering in the direction in which a source calling for steering inhibition is detected. To be more precise, in the event that a right steering inhibition signal is issued at a point when the vehicle is being steered to the left, low pressure fluid is channeled from the right hydraulic fluid chamber 21 into the tank 41 by way of the valve chamber 54 of the first flow control valve 51 and control valve 23, with the result that no high pressure fluid is channeled into the pressure sensitive chamber 56 of the first flow control valve 51. In the first flow control valve 51, the valve member 55, which moves in unison with the pressure sensitive member 57, thus moves to make the opening of the throttling area 59 wider by the elastic force of the spring 58. Therefore, in the first flow control valve 51, there is no reduction of the flow of hydraulic fluid from the control valve 23 into the left hydraulic fluid chamber 22 for the purpose of generating assistance power for steering to the left. This will serve to ensure that steering to the left is not inhibited.

Similarly, in the event that a left steering inhibition signal is issued at a point when the vehicle is being steered to the right, there is no reduction of the flow of hydraulic fluid for the generation of right steering assistance power from the control valve 23 into the right hydraulic fluid chamber 21 in the second flow control valve 52. There is thus no inhibition of steering to the right.

In other words, the application of steering inhibition can be confined to the direction in which there is a danger of collision with a nearby obstacle without the need of special purpose actuators, so that the configuration is simplified. The present configuration also dispenses with the need to switch the direction of application of steering inhibition in accordance with the steering direction in which the possibility of collision with an obstacle arises. It is thus possible to confine steering inhibition to the direction in which a potential collision obstacle is detected simply by issuing steering inhibition signals in response to the receipt of obstacle detection signals. Therefore, all that is necessary for the controller 71, which issues the steering inhibition signal is to issue a solenoid drive current, which is generated by amplifying the obstacle detection signal, as a steering inhibition signal to the solenoid 65 of the solenoid switching valve 61 or 62 corresponding to the sensor 73,74,75 or 76 detecting the obstacle. The controller 71 can thus be kept fairly simple.

In the power steering device 1 outlined above, the degree of steering inhibition is matched to the strength of the driver's steering effort. To be more precise, if, while right steering inhibition is being applied, the driver varies the steering effort for the right steering, the pressure of the high pressure fluid being channeled from the control valve 23 into the valve chamber 54 and the pressure sensitive chamber 56 is varied to match the variation of the driver's steering effort. The variation of pressure of the high pressure fluid gives rise to a variation of the opening of the throttling area 59. Since the variation of the opening of the throttling area 59 necessarily results in a variation of the flow of hydraulic fluid for the generation of right steering assistance power, so that there is a variation of the force with which steering to the right is being inhibited.

Similarly, if, while left steering inhibition is being applied, the driver varies the steering effort for the left steering, the force with which steering to the left is being inhibited is varied. This enables the degree of steering inhibition to be matched to the strength of the driver's steering effort, thereby enabling an appropriate level of steering inhibition to be applied without unnecessarily complicating the control system.

In the above configuration, if the driver increases the right steering effort while the right steering is being inhibited, the throttling area 59 of the first flow control valve 51 is closed completely as shown in FIG. 4(3), so that the degree of steering inhibition is increased to its maximum level. In this case, the valve chamber 54 is connected to the tank 41 by way of the pressure sensitive chamber 56 and the bypass fluid channel 67, thereby returning the high pressure fluid channeled into the first flow control valve 51 to the low pressure side.

Again, if the driver increases the left steering effort while the left steering is being inhibited, the throttling area 59 of the second flow control valve 52 is closed completely, so that the degree of steering inhibition is increased to its maximum level. In this case, the high pressure fluid channeled into the second flow control valve 52 is returned to the low pressure side.

Thus, even if a driver continue to apply steering effort even while his/her steering is being inhibited, there is no application of hydraulic fluid pressure in excess of the relief pressure of the pump 37, so that problems that arises from excessive hydraulic fluid pressure can be avoided.

In the above configuration, the application and release of steering inhibition commensurate with the strength of the driver's steering effort is achieved only by means of the switching action of the solenoid switching valves 61,62. This enables the configuration to be significantly simplified.

Figure 5:
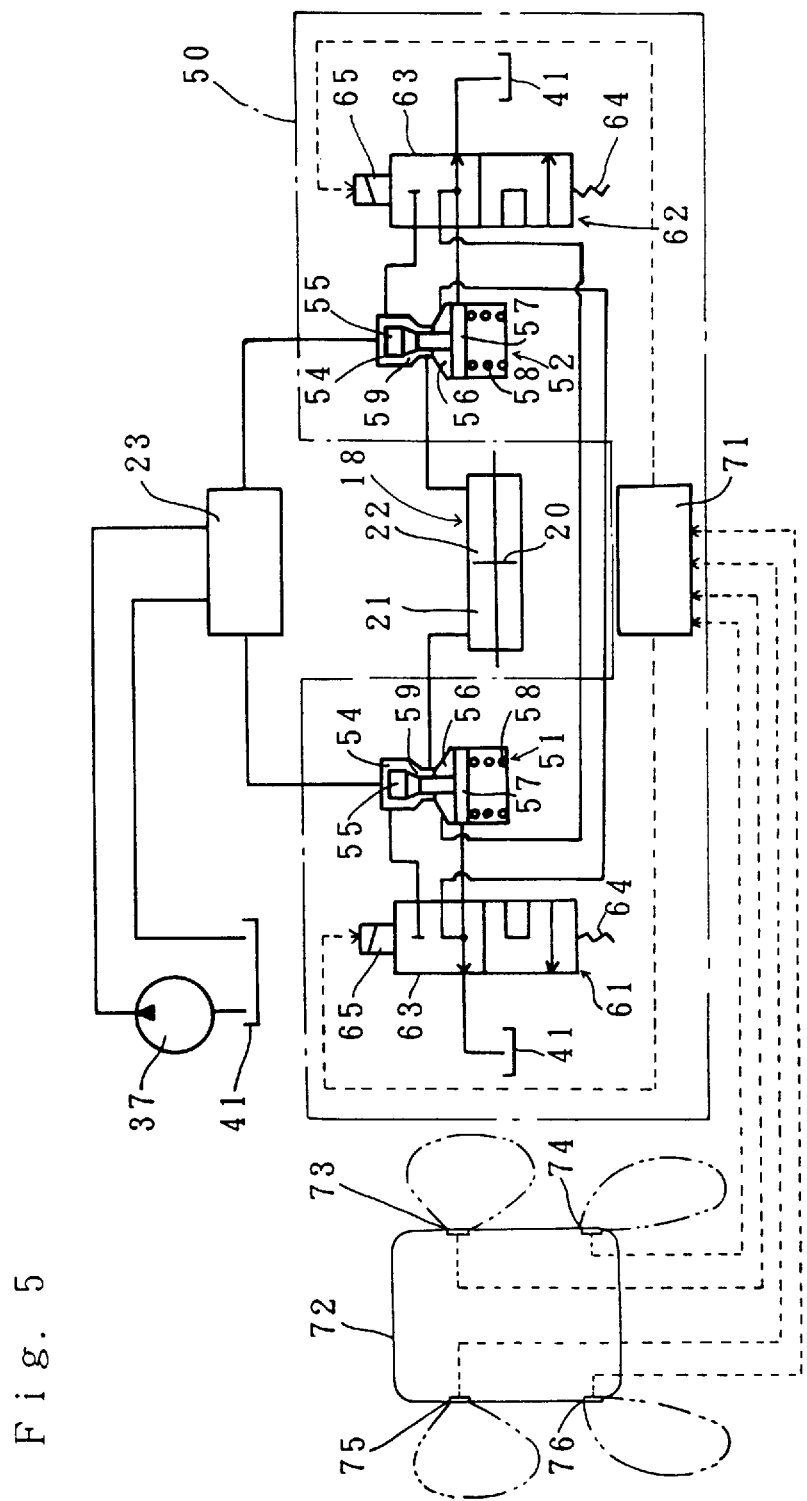
FIG. 5: A schematic diagram illustrating the configuration of the hydraulic power steering device of the second embodiment of the invention.

FIG. 5 shows the second embodiment of the present invention. The following section describes only areas in which the second embodiment differs from the first embodiment described above. The same numerical labels is applied to all areas in which the two embodiments are identical.

The driving condition illustrated in the figure is that of the steering inhibition release mode in which the solenoid 65 is not subject to excitation. In the steering inhibition release mode, the first solenoid switching valve 61 connects the pressure sensitive chamber 56 of the second flow control valve 52 to the low pressure side, that is, to the tank 41, and the second solenoid switching valve 62 connects the pressure sensitive chamber 56 of the first flow control valve 51 to the low pressure side, that is, to the tank 41. If the spool 63 then rises in response to excitation of the solenoid 65, the steering inhibition release mode represented in the figure is switched to the steering inhibition application mode. In the steering inhibition application mode, the first solenoid switching valve 61 connects the pressure sensitive chamber 56 of the second flow control valve 52 to the valve chamber 54 of the first flow control valve 51, and the second solenoid switching valve 62 connects the pressure sensitive chamber 56 of the first flow control valve 51 to the valve chamber 54 of the second flow control valve 52. All other configurational features are identical to those of the first embodiment of the invention outlined above.

In this second embodiment, when the issue of a right steering inhibition signal excites the solenoid 65 of the first solenoid switching valve 61, the pressure sensitive chamber 56 of the second flow control valve 52 is connected to the valve chamber 54 of the first flow control valve 51. This causes high pressure fluid to be channeled by way of the valve chamber 54 of the first flow control valve 51 into the pressure sensitive chamber 56 of the second flow control valve 52. This in turn causes the pressure sensitive member 57 of the second flow control valve 52 to move into a position in which the pressure of the high pressure fluid and the elastic force of the spring 58 are in balance with each other. When the pressure sensitive member 57 moves in this way, the valve member 55 of the second flow control valve 52 moves in unison with the valve member 55, thereby narrowing the opening of the throttling area 59 of the second flow control valve 52. When the second flow control valve 52 is operated in this way, there is a reduction in the flow of hydraulic fluid for the generation of right steering assistance power between the hydraulic fluid chambers 21,22 of the hydraulic cylinder 18 and the control valve 23. This enables the inhibition of steering to the right.

Similarly, when the issue of a left steering inhibition signal excites the solenoid 65 of the second solenoid switching valve 62, the pressure sensitive chamber 56 of the first flow control valve 51 is connected to the valve chamber 54 of the second flow control valve 52. This causes high pressure fluid to be channeled by way of the valve chamber 54 of the second flow control valve 52 into the pressure sensitive chamber 56 of the first flow control valve 51. This in turn causes the pressure sensitive member 57 of the first flow control valve 51 to move into a position in which the pressure of the high pressure fluid and the elastic force of the spring 58 are in balance with each other. When the pressure sensitive member 57 moves in this way, the valve member 55 of the first flow control valve 51 moves in union with the pressure sensitive member 57, thereby narrowing the opening of the throttling area 59 of the first flow control valve 51. This produces a reduction in the flow of hydraulic fluid for the generation of left steering assistance power between the hydraulic fluid chambers 21,22 of the hydraulic cylinder 18 and the control valve 23. This enables the inhibition of steering to the left.

All other functions and effects are as per those described in connection with the first embodiment of the invention outlined above.

Figure 6:
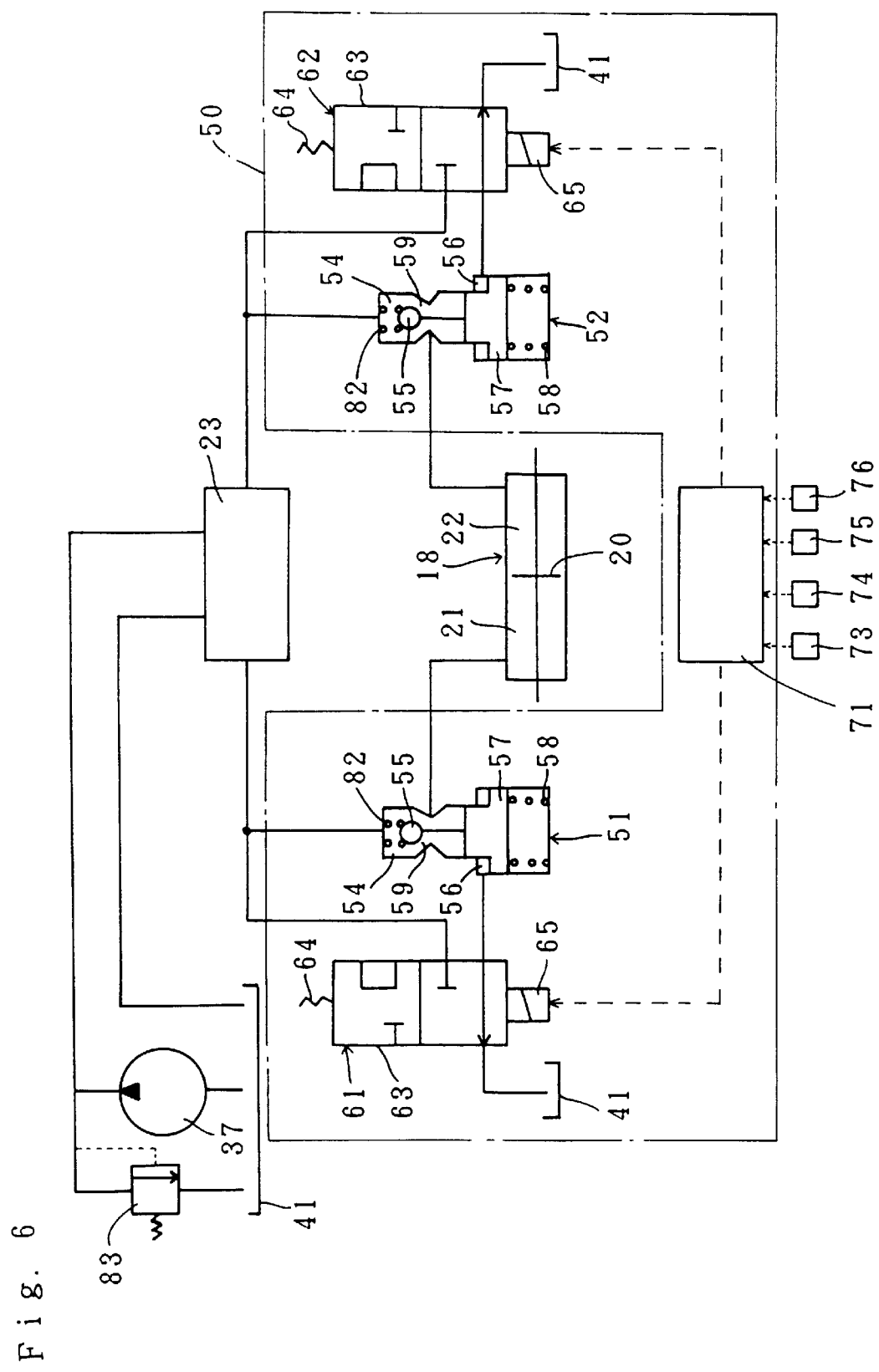
FIG. 6: A schematic diagram illustrating the configuration of the hydraulic power steering device of the third embodiment of the invention.

FIG. 6 shows the third embodiment of the present invention. The following section describes only areas in which the third embodiment differs from the first embodiment described above. The same numerical labels is applied to all areas in which the two embodiments are identical.

First, the valve member 55 and the pressure sensitive member 57 are separate from each other. In this case, the valve member 55 is kept pressed against the pressure member 57 by the elastic force of a spring 82. Each of the solenoid switching valves 61,62 does not have a configuration to connect the valve chambers 54 of the flow control valves 51,52 to the low pressure side, that is, the tank 41, when each of the flow control valves 51,52 is operated and the flow of hydraulic fluid for the generation of steering assistance power is minimum. All other configurational features are identical to those of the first embodiment outlined above.

In the third embodiment, since the valve member 55 and the pressure member 57 are separate from each other, breakage by a stress in the area in which the two members contact to each other does not arise, whatever how great the stress acting upon the area between the two members 55,57. In the event that a driver increases his/her steering effort while steering inhibition is being applied, high pressure fluid can be returned to the tank 41 by opening a relief valve 83 of the pump 37. All other functions and effects are as per those described in connection with the first embodiment outlined above.

Figure 7:
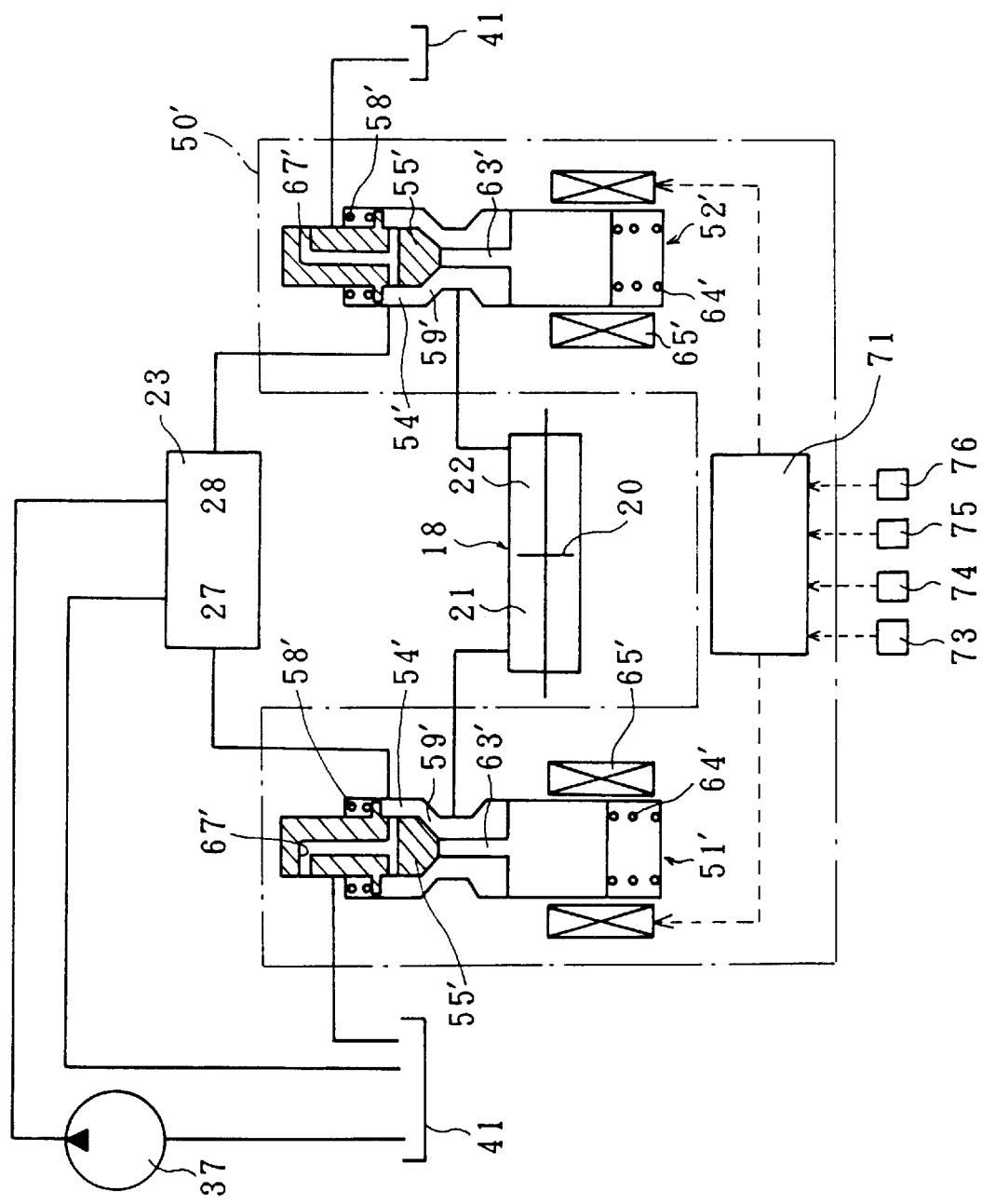
FIG. 7: A schematic diagram illustrating the configuration of the hydraulic power steering device of the fourth embodiment of the invention.

FIGS. 7 and 8 show the fourth embodiment of the present invention. The following section describe only areas in which the fourth embodiment differs from the first embodiment described above. The same numerical labels is applied to all areas in which the two embodiments are identical.

First, the steering inhibition mechanism 50' has a first flow control valve 51', which is located in the fluid channel between the right hydraulic fluid chamber 21 and the control valve 23, and a second flow control valve 52', which is located in the fluid channel between the left hydraulic fluid chamber 22 and the control valve 23. As shown in FIGS. 8(1) and 8(2), each of the two flow control valves 51',52' has a housing 53', a valve chamber 54' incorporated into the housing 53', a valve member 55' contained within the valve chamber 54', a spring 58' which exerts an elastic force on the valve member 55', a spool 63' incorporated into the housing 53', a spring 64' which exerts an elastic force on the spool 63', and a solenoid 65'. Each solenoid 65' is connected to the controller 71 in the same way as in the first embodiment.

Each valve member 55' is provided with a bypass fluid channel 67'. As shown in FIG. 8(2), excitation of each solenoid 65' causes the spool 63' to move against the elastic force of the spring 64'. As the spool 63' moves downwards as shown in the figure, this also makes the valve members 55' to move downwards in response to the elastic force exerted by the spring 58' as shown in the figure. At times when the aforementioned signals are not being received from the obstacle detection sensors 73,74,75,76, the valve chamber 54' of the first flow control valve 51' is connected by way of the fluid channel to the right hydraulic fluid chamber 21 and the right steering slots 27 of the control valve 23, similarly, the valve chamber 54' of the second flow control valve 52' is connected by way of the fluid channel to the left hydraulic fluid chamber 22 and the left steering slots 28 of the control valve 23. Each of the two flow control valves 51',52' has a throttling area 59'. Downward movement of the valve member 55' narrows the opening of the throttling area 59', and in so doing narrows the fluid channel between the control valve 23 and the hydraulic cylinder 18.

FIG. 8(1) illustrates a situation in which the solenoid 65' is not being excited. In this situation, the valve member 55' is positioned towards the upper end of the valve chamber 54' as shown in the figure, so that the throttling area 59' is fully open. FIG. 8(2) illustrates a situation in which the solenoid 65' is subject to excitation. In this situation, the valve member 55' is positioned towards the lower end of the valve chamber 54' as shown in the figure, so that the throttling area 59' is completely closed. When the throttling area 59' is completely closed as shown in FIG. 8(2), the valve chamber 54' is connected by way of the bypass fluid channel 67' to the low pressure side, that is, to the tank 41. In other situations, the outlet of the bypass fluid channel 67' is closed as shown in FIG. 8(1). All other configurational features are identical to those of the first embodiment outlined above.

In the fourth embodiment of the present invention, the controller 71 responds to the input of an obstacle detection signal from any of the right steering obstacle detection sensors 73,74 by issuing a right steering inhibition signal to the solenoid 65' of the first flow control valve 51'. This serves to excite the solenoid 65' which responds by moving down the spool 63' of the first flow control valve 51' as shown in FIG. 8(2). The valve member 55' is also moved downwards in unison with the spool 63', and this has the effect of closing the throttling area 59'. This operation of the first flow control valve 51' thus has the effect of reducing the flow of hydraulic fluid for the generation of right steering assistance power supplied from the control valve 23 to the right hydraulic fluid chamber 21 to zero. This in turn locks the movement of the hydraulic cylinder 18, so that right steering is inhibited. When the right steering inhibition signal is canceled, the spool 63' of the first flow control valve 51' moves upwards in response to the elastic force exerted on it by the spring 64' as shown in FIG. 8(1). The valve member 55' also rises in unison with the spool 63', thereby the opening of the throttling area 59' is completely opened. This prevents inhibition of steering to the right.

The controller 71 responds to the input of an obstacle detection signal from any of the left steering obstacle detection sensors 75,76 by issuing a left steering inhibition signal to the solenoid 65' of the second flow control valve 52'. This serves to excite the solenoid 65', which responds by causing the flow of hydraulic fluid for the generation of left steering assistance power supplied from the control valve 23 to the left hydraulic fluid chamber 22 to be reduced to zero. This operation of the second flow control valve 52' thus causes the movement of the hydraulic cylinder 18 to lock, so that the left steering is inhibited. When the left steering inhibition signal is canceled, the spool 63' of the second flow control valve 52' moves upwards in response to the elastic force exerted on it by the spring 64' as shown in the figure. Thereby, the opening of the throttling area 59' is completely opened. This prevents inhibition of steering to the left.

In the event that left steering is being carried out when a right steering inhibition signal is received, low pressure fluid is drained away by way of the right hydraulic fluid chamber 21, the valve chamber 54' of the first flow control valve 51' and the control valve 23 into the tank 41. This flow of low pressure fluid causes the valve member 55' of the first flow control valve 51' to move against the elastic force of the spring 58' and make the opening of the throttling area 59' wider. In other words, in the first flow control valve 51', there is no reduction of the flow of hydraulic fluid for the generation of left steering assistance power, which flows between the control valve 23 and the right hydraulic fluid chamber 21. This ensures that steering to the left is not inhibited.

Similarly, if a left steering inhibition signal is received while right steering is being carried out, there is no reduction in the second flow control valve 52' of the flow of hydraulic fluid for the generation of right steering assistance power, which flows between the control valve 23 and the left hydraulic fluid chamber 22. This ensures that steering to the right is not inhibited.

When right steering inhibition is being applied, the valve chamber 54' of the first flow control valve 51' is connected to the tank 41 by way of the bypass fluid channel 67'. This enables the high pressure fluid supplied to the first flow control valve 51' to be returned to the low pressure side. Similarly, when left steering inhibition is being applied, the valve chamber 54' of the second flow control valve 52' is connected to the tank 41 by way of the bypass fluid channel 67'. This enables the high pressure fluid supplied to the second flow control valve 52' to be returned to the low pressure side. Thus, in the event that a driver increases his/her steering effort despite the application of steering inhibition, it is possible to prevent the emergence of a problem due to the application of a pressure in excess the relief pressure of the pump 37. Moreover, while steering is being inhibited, the hydraulic cylinder 18 is locked, so that the degree of steering inhibition also remains constant regardless of the variation of the driver's steering effort. All other actions and effects are as per those described in connection with the first embodiment of the invention outlined above.

Figure 9:
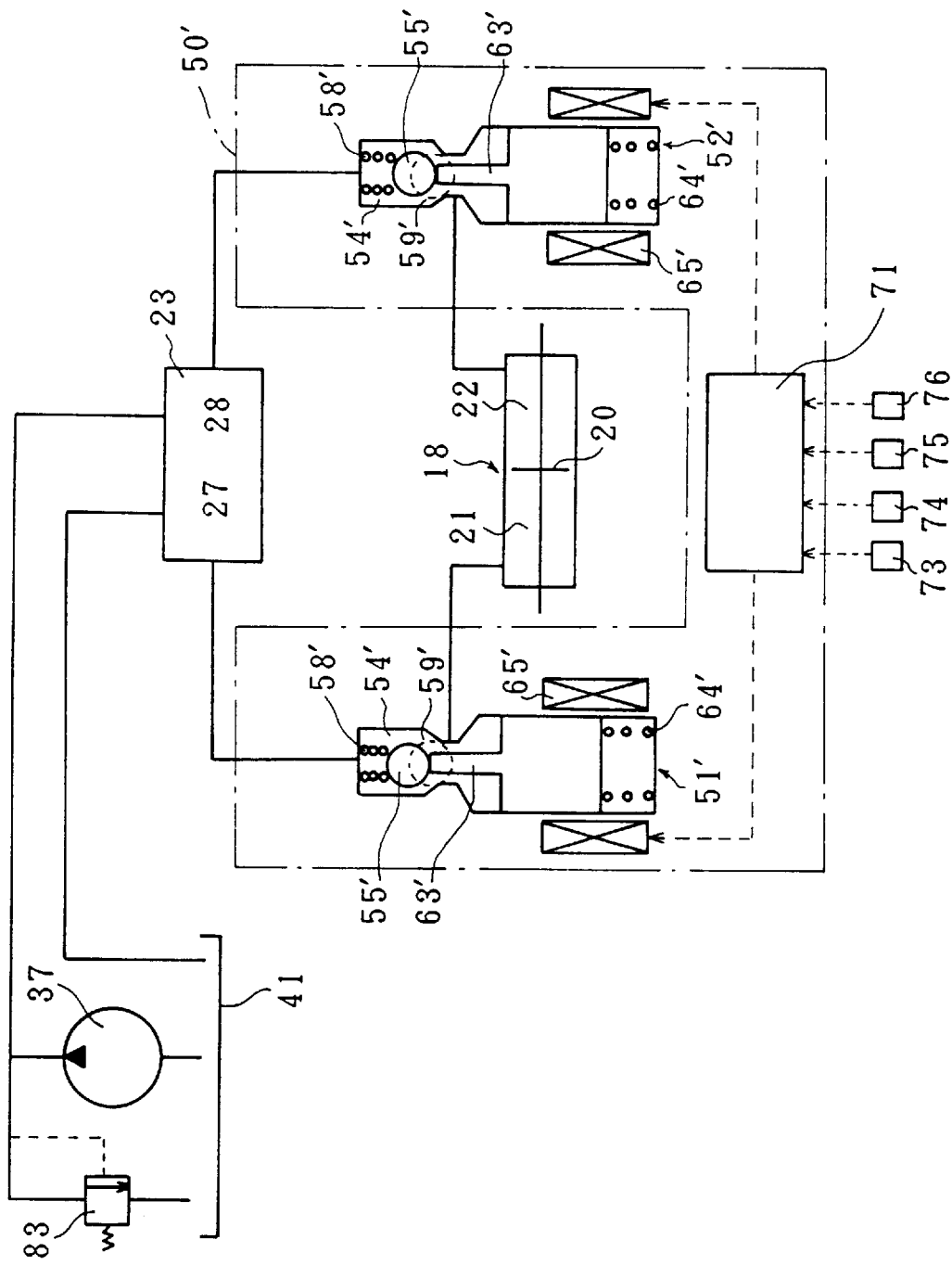
FIG. 9: A schematic diagram illustrating the configuration of the hydraulic power steering device of the fifth embodiment of the invention.

FIG. 9 shows the fifth embodiment of the present invention. Unlike the fourth embodiment described above, each of the flow control valves 51',52' of the fifth embodiment is designed such that the valve chamber 54' is not connected with the tank 41 when the valves 51',52' are operated. Furthermore, in the event that the driver increases his/her steering effort while steering inhibition is applied, the relief valve 83 of the pump 37 is opened and the high pressure fluid is returned to the tank 41. The same numerical labels is applied to all other areas in which the two embodiments are identical.

Figure 10:
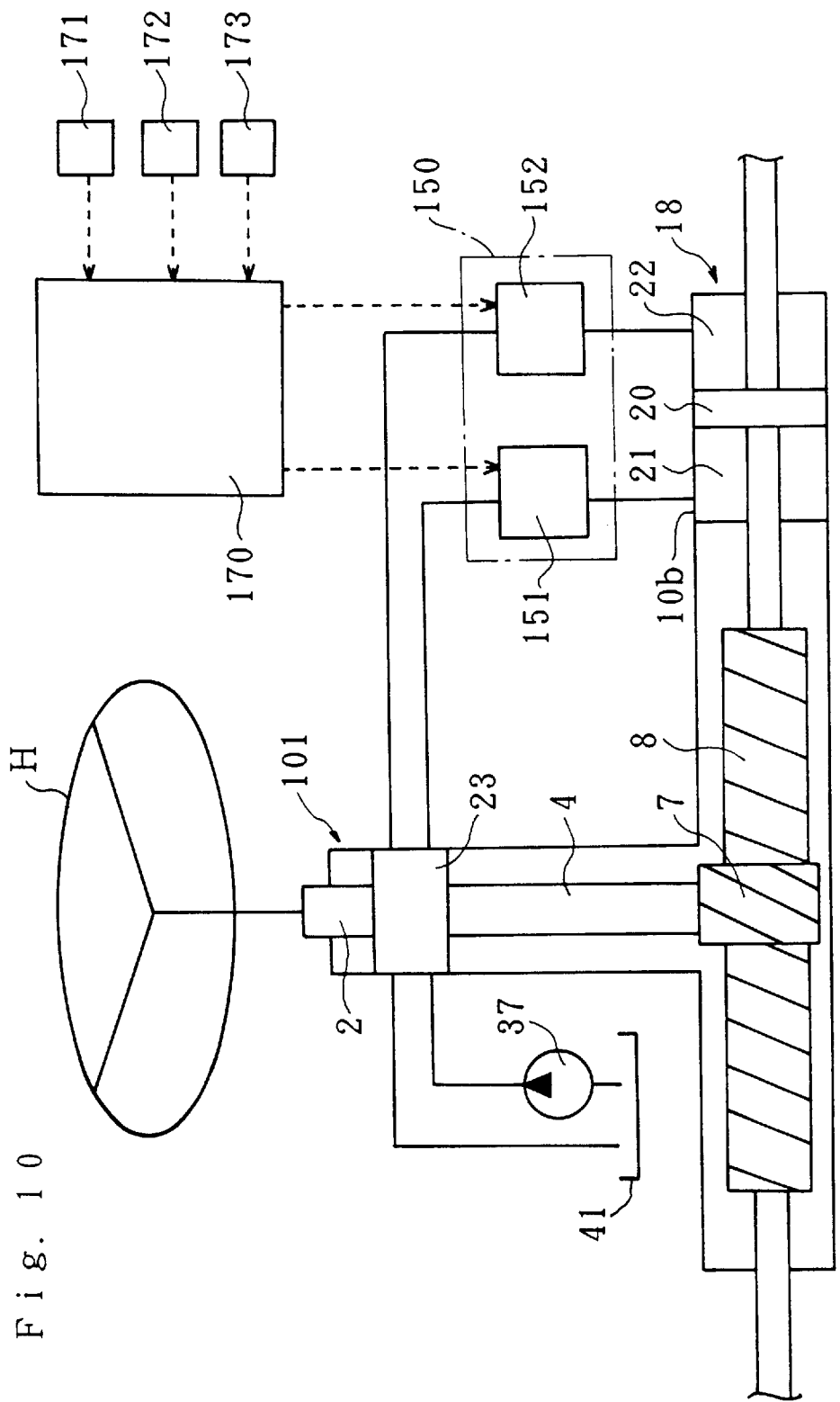
FIG. 10: A schematic diagram illustrating the configuration of the hydraulic power steering device of the sixth embodiment of the invention.
Figure 11:
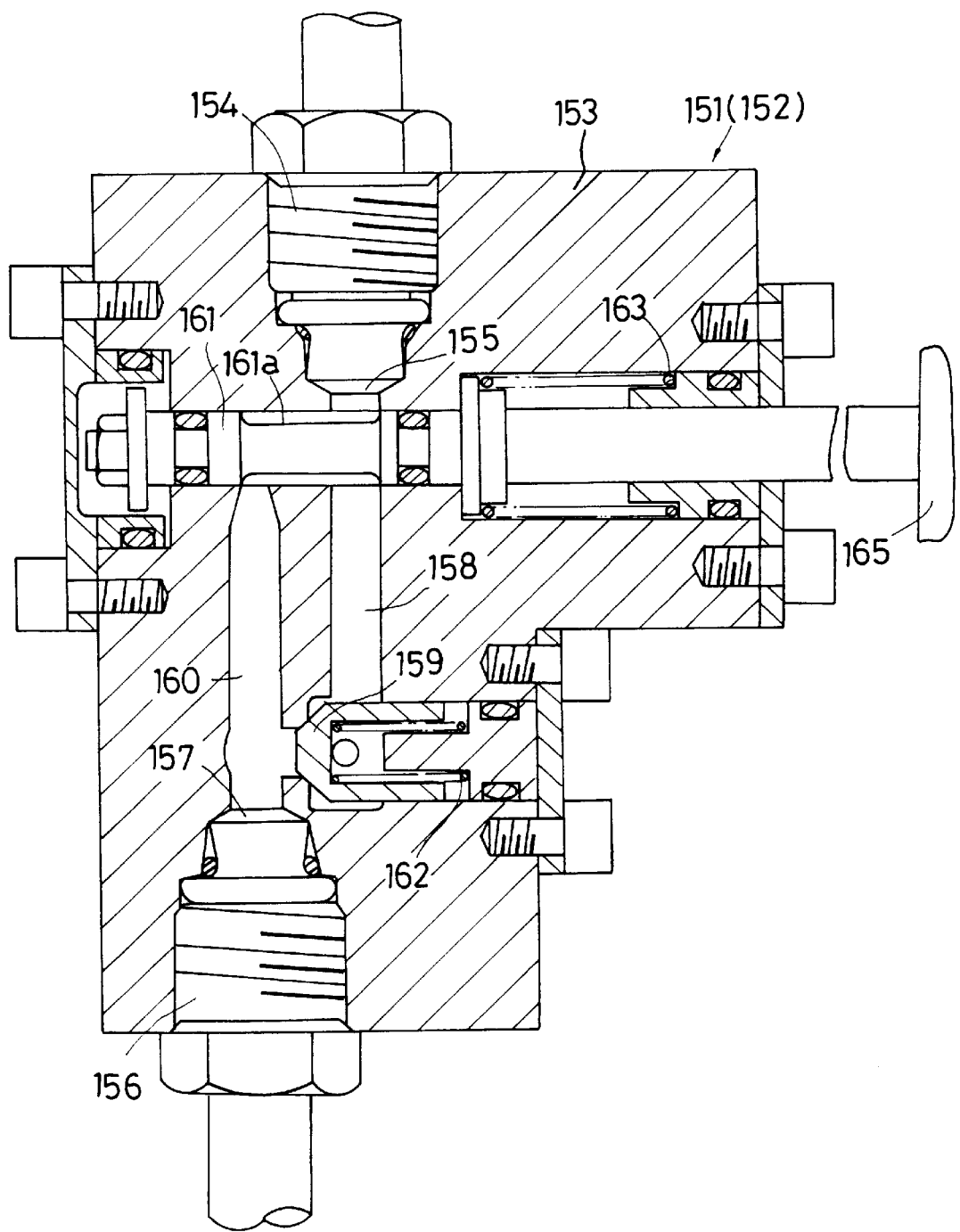
FIG. 11: A cross sectional view of the steering inhibition mechanism of the hydraulic power steering device of the sixth embodiment of the invention.
Figure 12:
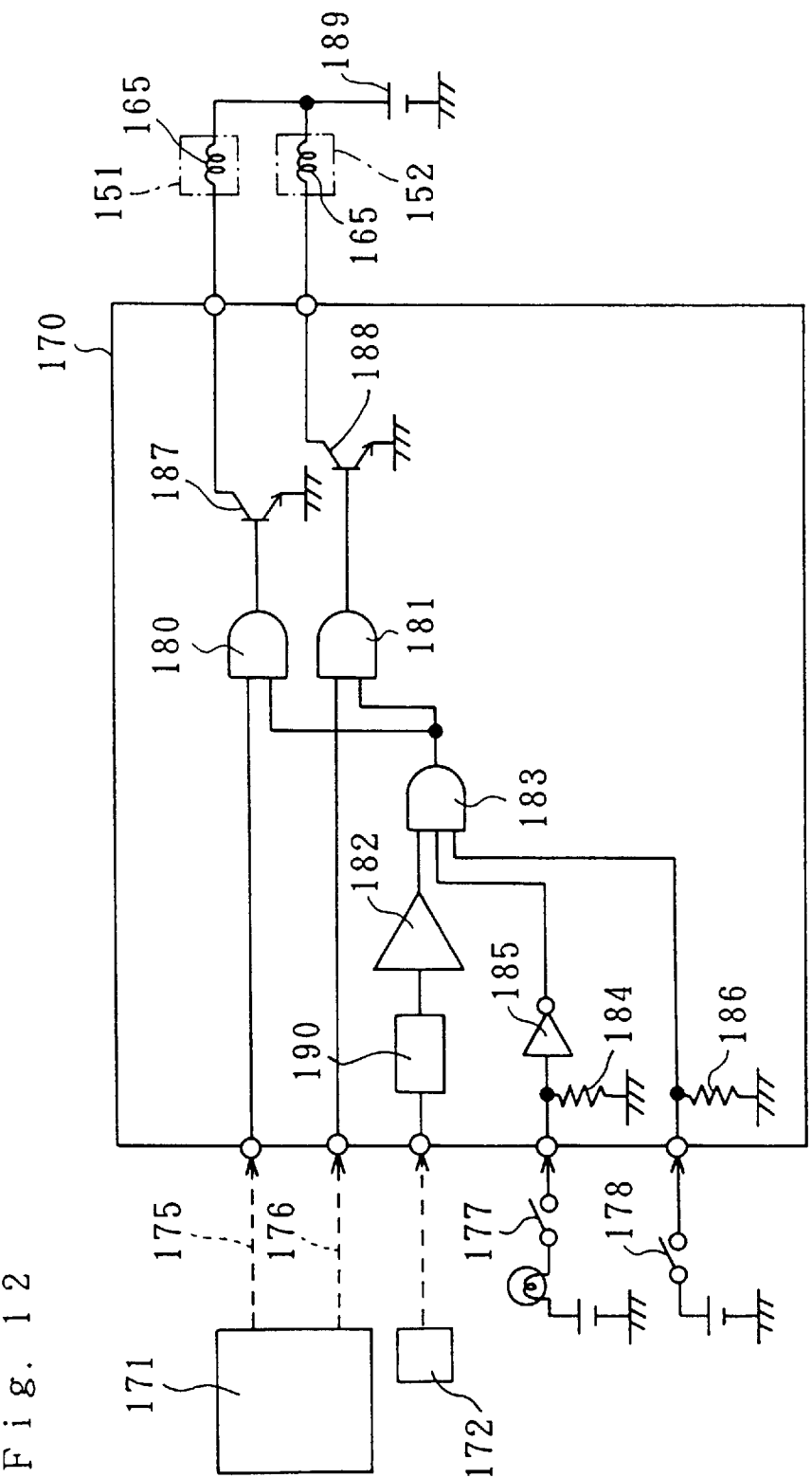
FIG. 12: A schematic representation of the drive circuits of the hydraulic power steering device of the sixth embodiment of the invention.

The following section contains a description of the sixth embodiment of the present invention by reference to FIGS. 10 to 12.

As in the case of the first preferred embodiment of the invention above, the rack and pinion hydraulic power steering device 101 illustrated in FIG. 10 incorporates an input shaft 2 connected to a steering wheel H, an output shaft 4 connected to the input shaft 2 by way of a torsion bar (omitted from the drawing), a pinion 7 on the output shaft 4, a rack 8 which meshes with the pinion 7, and a hydraulic cylinder 18 for the generation of steering assistance power. The hydraulic cylinder 18 has a cylinder tube formed from the rack housing 10b and a piston 20, the piston 20 forming a single unit with the rack 8.

A right hydraulic fluid chamber 21 for right steering assistance power generation and the left hydraulic fluid chamber 22 for left steering assistance power generation of the hydraulic cylinder 18 are connected to a rotary type hydraulic control valve 23, which has the same configuration as in the first embodiment, by way of a steering inhibition mechanism 150, which is described in more detail below. In the event that the steering of the vehicle is not being inhibited and the driver steers the vehicle away from its current straight course to the right, high pressure fluid is pumped from the pump 37 into the right hydraulic fluid chamber 21 at a pressure determined in accordance with the strength of the driver's steering effort. At the same time, low pressure fluid is drained away from the left hydraulic fluid chamber 22 and returned to the tank 41. Similarly, if the steering of the vehicle is not being inhibited and the driver steers the vehicle away from its current straight course to the left, high pressure fluid is pumped from the pump 37 into the left hydraulic fluid chamber 22 at a pressure determined in accordance with the strength of the driver's steering effort. At the same time, low pressure fluid is drained away from the right hydraulic fluid chamber 21 and returned to the tank 41.

The steering inhibition mechanism 150 comprises a first steering inhibition mechanism 151 for the inhibition of right steering, which is located in the fluid channel between the right hydraulic fluid chamber 21 and the control valve 23, and a second steering inhibition mechanism 152 for the inhibition of left steering, which is located in the fluid channel between the left hydraulic fluid chamber 22 and the control valve 23.

As shown in FIG. 11, each of the first and second steering inhibition mechanisms 151,152 has a main body 153, a first port 155, which is connected to the control valve 23 by way of a pipe connector 154, a second port 157, which is connected to the hydraulic cylinder 18 by way of another pipe connector 156, a check valve 159, which is located in the main fluid channel 158 connecting the first port 155 to the second port 157, and a spool 161, which is used to open and close the bypass fluid channel 160 connecting the first port 155 to second port 157.

The check valve 159 in the main fluid channel 158 responds to the elastic force of a spring 162 by stopping the flow of high pressure fluid from the control valve 23 to the hydraulic cylinder 18, and allows a flow of fluid from the hydraulic cylinder 18 to the control valve 23.

The spool 161 contains a circumferential groove 161a. The elastic force of a spring 163 pushes the spool 161 in a left ward direction as shown in the figure, thereby opening the bypass fluid channel 160 by way of the circumferential groove 161a. The spool 161 is also linked to the solenoid 165. The solenoid 165 is in turn connected to a drive circuit 170, which is described in more detail below. When the solenoid 165 is excited, it moves to the right of the figure such that the outer surface of the spool 161 closes the bypass fluid channel 160.

The solenoid 165 of each of the inhibition mechanism 151,152 is connected to an output terminal of the drive circuit 170, and the input terminals of the drive circuit 170 are connected to a steering inhibition source detector 171, a vehicle velocity sensor 172, and a deceleration operation sensor 173, as shown in FIG. 10.

As shown in FIG. 12, the steering inhibition source detector 171 responds to the receipt of an obstacle detection signal from any of a plurality of obstacle detection sensors (omitted from the figure), with which the vehicle is fitted in the same way as is described above in the first embodiment of the invention, by outputting a right steering inhibition source detection signal 175 or a left steering inhibition source detection signal 176 to the drive circuit 170. The vehicle velocity sensor 172 outputs a frequency pulse signal corresponding to the velocity of the vehicle. The deceleration operation sensor 173 has a braking operation detection switch 177 and an acceleration operation detection switch 178. The braking operation detection switch 177 closes in response to pressure on the brake and opens in response to the release of the pressure. The acceleration operation detection switch 178 closes in response to pressure on the accelerator and closes in response to the release of the pressure.

In the drive circuit 170, the right steering inhibition source detection signal 175 is input as a high signal to a first logical product circuit 180, and the left steering inhibition source detection signal 176 is input as a high signal to the second logical product circuit 181. The vehicle velocity sensor 172 is connected by way of a frequency-voltage conversion circuit 190 to a comparison circuit 182. In the event that the vehicle velocity detected by the vehicle velocity sensor 172 is found to exceed a preset value, the comparison circuit 182 outputs a preset vehicle velocity detection signal. The preset vehicle velocity detection signal is input to the third logical product circuit 183 as a high signal. The braking detection switch 177 is connected by way of an earthed resistance 184 to an inverter 185. The inverter 185 is in turn connected to the input terminal of the third logical product circuit 183. When the braking detection switch 177 is opened, a high signal is input to the third logical product circuit 183. The acceleration detection switch 178 is connected by way of an earthed resistance 186 to the input terminals of the third logical product circuit 183. When the acceleration detection switch 178 is closed, a high signal is input to the third logical product circuit 183. The output terminals of the third logical product circuit 183 are connected to the input terminal of the first logical product circuit 180 and the input terminal of the second logical product circuit 181. The output terminal of the first logical product circuit 180 is connected to the base of the first transistor 187. The collector of the first transistor 187 is connected to the solenoid 165 of the aforementioned first inhibition mechanism 151. The output terminal of the second logical product circuit 181 is connected to the base of the second transistor 188. The collector of the second transistor 188 is connected to the solenoid 165 of the aforementioned second inhibition mechanism 152. The solenoids 165 are connected to a power supply 189. The emitters of the transistor 187,188 and the power supply 189 are earthed.

In the sixth embodiment of the invention outlined above, the steering device 101 can be switched between the steering inhibition application mode and the steering inhibition release mode regardless of whether the vehicle is being steered or not. The steering inhibition is applied only to steering in the direction in which a source calling for steering inhibition is detected.

In other words, if the braking detection switch 177 is opened, the acceleration operation detection switch 178 is closed, the vehicle velocity is founded to exceed the preset value, and a right steering inhibition source is detected by the steering inhibition source detector 171, the third logical product circuit 183 outputs a high signal to the first and second logical product circuits 180,181, and thus the first logical product circuit 180 outputs a high signal to the base of the first transistor 187. This has the effect of switching the first transistor 187 on, and the solenoid 165 of the first inhibition mechanism 151 is consequently subjected to excitation. When the solenoid is excited 165, it causes the spool 161 to close off the bypass fluid channel 160. The system is thus switched into a mode in which steering inhibition can be applied to right steering. If right steering is at this point being carried out, the high pressure fluid channeled into the main fluid channel 158 of the first inhibition mechanism 151 from the control valve 23 is prevented by the check valve 159 from reaching the right hydraulic fluid chamber 21. Therefore, steering assistance power can no longer be generated, so that right steering is effectively inhibited. At the same time, if left steering is carried out while in this same mode, the return hydraulic fluid flowing into the bypass fluid channel 160 from the right hydraulic fluid chamber 21 can be returned by way of the control valve 23 to the tank 41, because the check valve 159 is open. Thus, insofar as the source calling for the inhibition of left steering is not detected, left steering inhibition is not applied.

Similarly, if the braking operation detection switch 177 is opened, the acceleration detection operation switch 178 is closed, the vehicle velocity is founded to exceed the preset value, and a left steering inhibition source is detected by the steering inhibition source detector 171, the third logical product circuit 183 outputs a high signal to the first and second logical product circuits 180,181, and thus the second logical product circuit 181 outputs a high signal to the base of the second transistor 188. This has the effect of switching the second transistor 188 on, and the solenoid 165 of the second inhibition mechanism 152 is consequently subjected to excitation. By the excitation of the solenoid 165, the steering device 101 is switched into a mode in which left steering can be inhibited.

When no source calling for the application of steering inhibition is detected, the solenoids 165 of the inhibition mechanism 151,152 are degaussed, and the system is thereby switched into the steering inhibition release mode.

In the event that the vehicle velocity is less than the preset value, the third logical product circuit 183 outputs a low signal to the first and second logical product circuits 180, 181, and the first and second logical product circuits 180,181 in turn output a low signal to the transistors 187,188. This has the effect of switching the transistors 187,188 off, and the solenoid 165 of the inhibition mechanism 151,152 are consequently degaussed. As a result of this degaussing, each spool 161 opens the bypass fluid channel 160, and high pressure fluid is channeled from the control valve 23 into the hydraulic cylinder 18 by way of the bypass fluid channel 160. This has the effect of switching the steering device 101 into the steering inhibition release mode. Similarly, if the braking operation detection switch 177 is closed in response to braking operation and/or the acceleration operation detection switch 178 is opened in response to a release of acceleration operation, the solenoids 165 of the inhibition mechanism 151,152 are degaussed in the same way as when the velocity of the vehicle is found to be less than the preset value, and the steering device 101 is switched into the steering inhibition release mode. Thus, in a situation in which the driver reduces the vehicle's velocity below the preset value by braking operation and/or release of acceleration operation to enable him/her, for example, to better negotiate a narrow, winding road or to avoid an obstacle in his/her path, the steering is not inhibited. This prevents the driver from skidding off the road or else crashing into the obstacle in his/her path.

The speed at which the steering inhibition is released is reduced in response to the strength of the driver's steering effort. To be more precise, when the spool 161 in FIG. 11 is moved to the right hand side and the solenoids 165 is degaussed, the elastic force of the spring 163 pushes the spool 161 back to the left so as to open the bypass fluid channel 160. If the driver's steering effort is being applied at this point, the pressure of the high pressure hydraulic fluid flowing from the control valve 23 into the main fluid channel 158 impedes the movement of the spool 161 to the left. Since the pressure of the high pressure hydraulic fluid flowing from the control valve 23 into the main fluid channel 158 is determined, as explained above, in accordance with the strength of the driver's steering effort, the movement of the spool 161 is thus impeded in response to the strength of the driver's steering effort. Thus, the larger the driver's steering effort is, the larger the impediment force to the movement of the spool 161 becomes, so that the speed at which the steering inhibition is released is slowed down. The sudden release of steering inhibition is thereby prevented, and the vehicle is prevented from swerving off the road.

In the inhibition mechanisms 151,152 illustrated in FIG. 11, as a modification example, it is equally acceptable for the first port 155 to be connected to the hydraulic cylinder 18 and for the second port 157 to be connected to the control valve 23. In this modification example, the solenoid 165 of the second inhibition mechanism 152 is excited when right steering inhibition is applied and the solenoid 165 of the first inhibition mechanism 151 is excited when left steering inhibition is applied.

Figure 13:
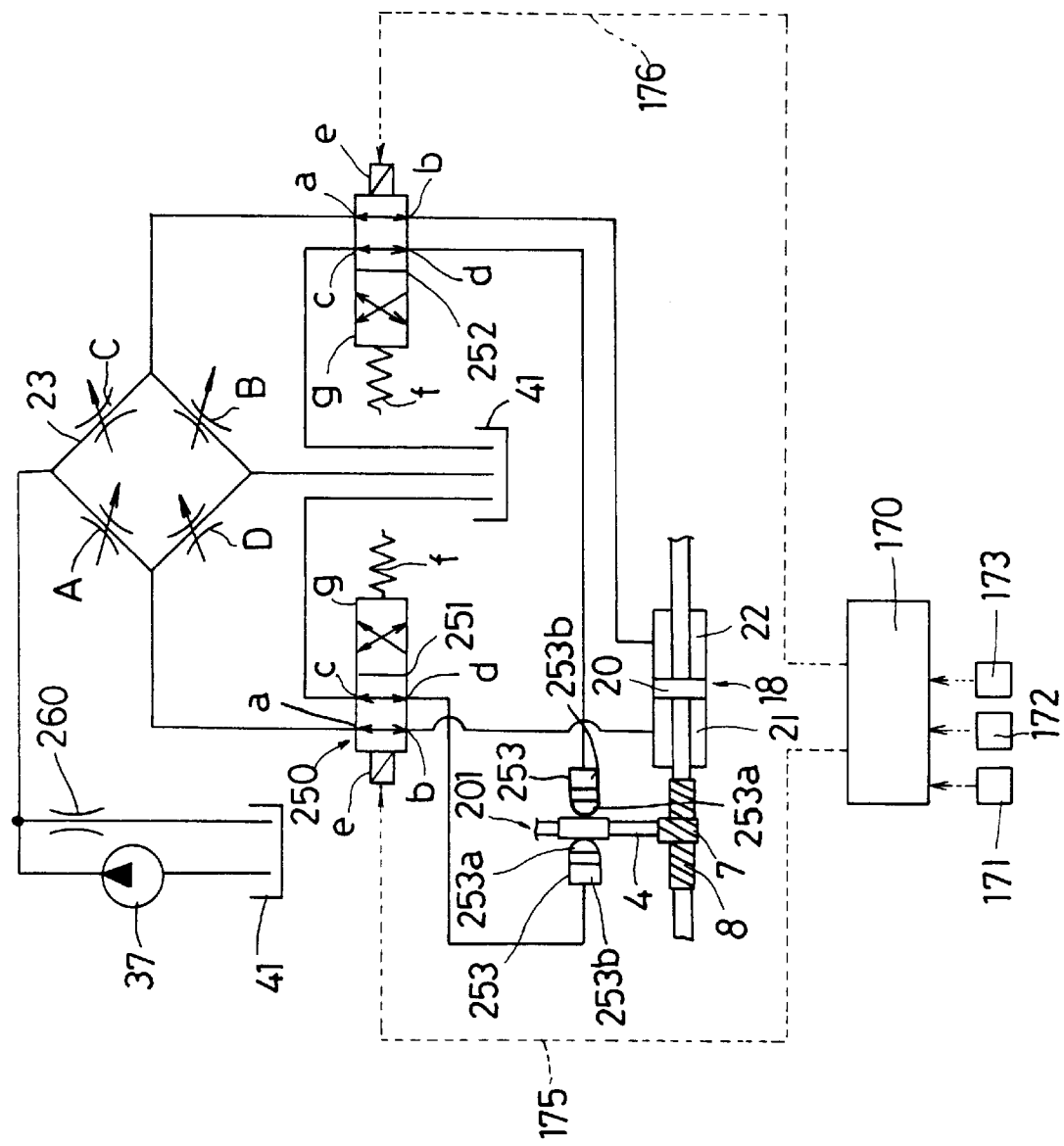
FIG. 13: A schematic diagram illustrating the configuration of the hydraulic power steering device of the seventh embodiment of the invention.

The following section contains a description of the seventh embodiment of the present invention by reference to FIG. 13.

As in the case of the first preferred embodiment of the invention above, the rack and pinion hydraulic power steering device 201 illustrated in FIG. 13 incorporates an input shaft (omitted from the drawing) connected to a steering wheel, an output shaft 4 connected to the input shaft by way of a torsion bar (omitted from the drawing), a pinion 7 on the output shaft 4, a rack 8 which meshes with said pinion 7, and a hydraulic cylinder 18 for the generation of steering assistance power. The hydraulic cylinder 18 has a cylinder tube formed from the rack housing 10b and a piston 20, the piston 20 forming a single unit with the rack 8.

The hydraulic fluid chamber 21 for the right steering assistance power generation and the left hydraulic fluid chamber 22 for the steering assistance power generation in the hydraulic cylinder 18 are connected to a rotary type hydraulic control valve 23, which has the same configuration as in the first embodiment described above, by way of a steering inhibition mechanism 250, which is described in more detail below.

The steering inhibition mechanism 250 has a first solenoid switching valve 251, which is used to inhibit steering to the right and which is located in the fluid channel between the right hydraulic fluid chamber 21 and the control valve 23, a second solenoid switching valve 252, which is used to inhibit steering to the left and which is located in the fluid channel between the left hydraulic fluid chamber 22 and the control valve 23, and an inhibition actuator 253.

The switching valves 251,252 are switched between two positions. Each of the switching valves 251,252 comprises a connection port a, which links with the control valve 23, a connection port b, which links with the hydraulic cylinder 18, a connection port c, which links with the tank 41, a connection port d, which links with the inhibition actuator 253, a port switching spool g, a spool activation solenoid e, and a spool return spring f. Each solenoid e is connected to the output terminal of a drive circuit 170, which has the same configuration as in the sixth embodiment outlined above. The input terminals of the drive circuit 170 are connected to a steering inhibition source detector 171, a vehicle velocity sensor 172 and a deceleration operation sensor 173, each of which has the same configuration as in the sixth embodiment.

The inhibition actuator 253 has fluid chambers 253b, which are incorporated into the rack housing (omitted from the drawing) which supports the output shaft 4, and plungers 253a, each of which is inserted into the fluid chamber 253b so as to be movable in and out along the radial direction of the output shaft 4. The tip of each plunger 253a is able to make contact with the outer circumference of the output shaft 4. The fluid chambers 253b are connected to the switching valves 251,252.

In the seventh embodiment of the invention outlined above, the system can be switched between the steering inhibition application mode and the steering inhibition release mode regardless of whether the vehicle is actually being steered or not. The degree of steering inhibition applied is matched to the strength of the driver's steering effort. The steering inhibition is applied only to steering in the direction in which a source calling for steering inhibition is detected.

To be more precise, the switching valves 251,252 in FIG. 13 are both set such that steering inhibition is not applied. If, while the steering device 201 is in this condition, the driver steers his/her vehicle away from its straight course to the right, high pressure fluid is pumped at a pressure determined in accordance with the strength of the driver's steering effort from the pump 37 by way of the control valve 23 and the first switching valve 251 into the right hydraulic fluid chamber 21. At the same time, low pressure fluid is returned by way of the second switching valve 252 and the control valve 23 from the left hydraulic fluid chamber 22 to the tank 41. Assistance power is generated in this way to assist the driver in steering to the right. Similarly, if the driver steers his/her vehicle away from its straight course to the left, high pressure fluid is pumped at a pressure determined in accordance with the strength of the driver's steering effort from the pump 37 by way of the control valve 23 and the second switching valve 252 into the left hydraulic fluid chamber 22. At the same time, low pressure fluid is returned by way of the first switching valve 251 and the control valve 23 from the right hydraulic fluid chamber 21 to the tank 41. Assistance power is generated in this way to assist the driver in steering to the left.

If the braking operation detection switch 177 is opened and the acceleration operation detection switch 178 is closed in the deceleration operation sensor 173, the vehicle velocity exceeds the preset value, and a right steering inhibition source is detected by the steering inhibition source detector 171, a right steering inhibition source detection signal 175 is output from the steering inhibition source detector 171 to the solenoid e of the first switching valve 251. This enables the first switching valve 251 to be switched such that the connection port a, which links with the control valve 23, is connected to the connection port d, which links with the inhibition actuator 253, and the connection port b, which links with the hydraulic cylinder 18, is connected to the connection port c, which links with the tank 41. If right steering is carried out while the steering device 201 is in this condition, high pressure fluid is supplied not to the right hydraulic fluid chamber 21 but to the steering inhibition actuator 253 from the control valve 23 in accordance with the strength of the driver's steering effort. Right steering inhibition is thus be applied in line with the strength of the driver's steering effort. If left steering is carried out while the steering device 201 is in this condition, high pressure fluid is pumped at a pressure determined in accordance with the degree of the driver's steering effort from the pump 37 by way of the control valve 23 and the second switching valve 252 into the left hydraulic fluid chamber 22. At the same time, low pressure fluid is returned from the right hydraulic fluid chamber 21 by way of the first switching valve 251 to the tank 41. This enables the generation of left steering assistance power.

Similarly, if the braking operation detection switch 177 is opened and the acceleration operation detection switch 178 is closed, the vehicle velocity exceeds the preset value, and a left steering inhibition source is detected by the steering inhibition source detector 171, a left steering inhibition source detection signal 176 is output from the steering inhibition source detector 171 to the solenoid e of the second switching valve 252. This enables the second switching valve 252 to be switched such that the connection port a, which links with the control valve 23, is connected to the connection port d, which links with the inhibition actuator 253, and the connection port b, which links with the hydraulic cylinder 18, is connected to the connection port c, which links with the tank 41. If left steering is carried out while the steering device 201 is in this condition, high pressure fluid is supplied not to the left hydraulic fluid chamber 22 but to the steering inhibition actuator 253 from the control valve 23 in accordance with the strength of the driver's steering effort. Left steering inhibition is thus applied in line with the strength of the driver's steering effort. If right steering is carried out while the steering device 201 is in this condition, high pressure fluid is pumped at a pressure determined in accordance with the strength of the driver's steering effort from the pump 37 by way of the control valve 23 and the first switching valve 251 into the right hydraulic fluid chamber 21. At the same time, low pressure fluid is returned from the left hydraulic fluid chamber 22 by way of the second switching valve 252 to the tank 41. This enables the generation of right steering assistance power.

To prevent the application of excessive steering inhibition, an invariable throttle 260 is connected to the tank 41 between the pump 37 and the control valve 23.

In the event that no sources calling for the inhibition of steering are detected, or the velocity of the vehicle is less than the preset value, or the braking operation detection switch is closed in response to the operation of the brake, or the acceleration operation detection switch is opened in response to the release of the accelerator, each of the solenoids e of the switch valve 251,252 is degaussed. The steering device 201 is thus switched into the steering inhibition release mode.

Figure 14:
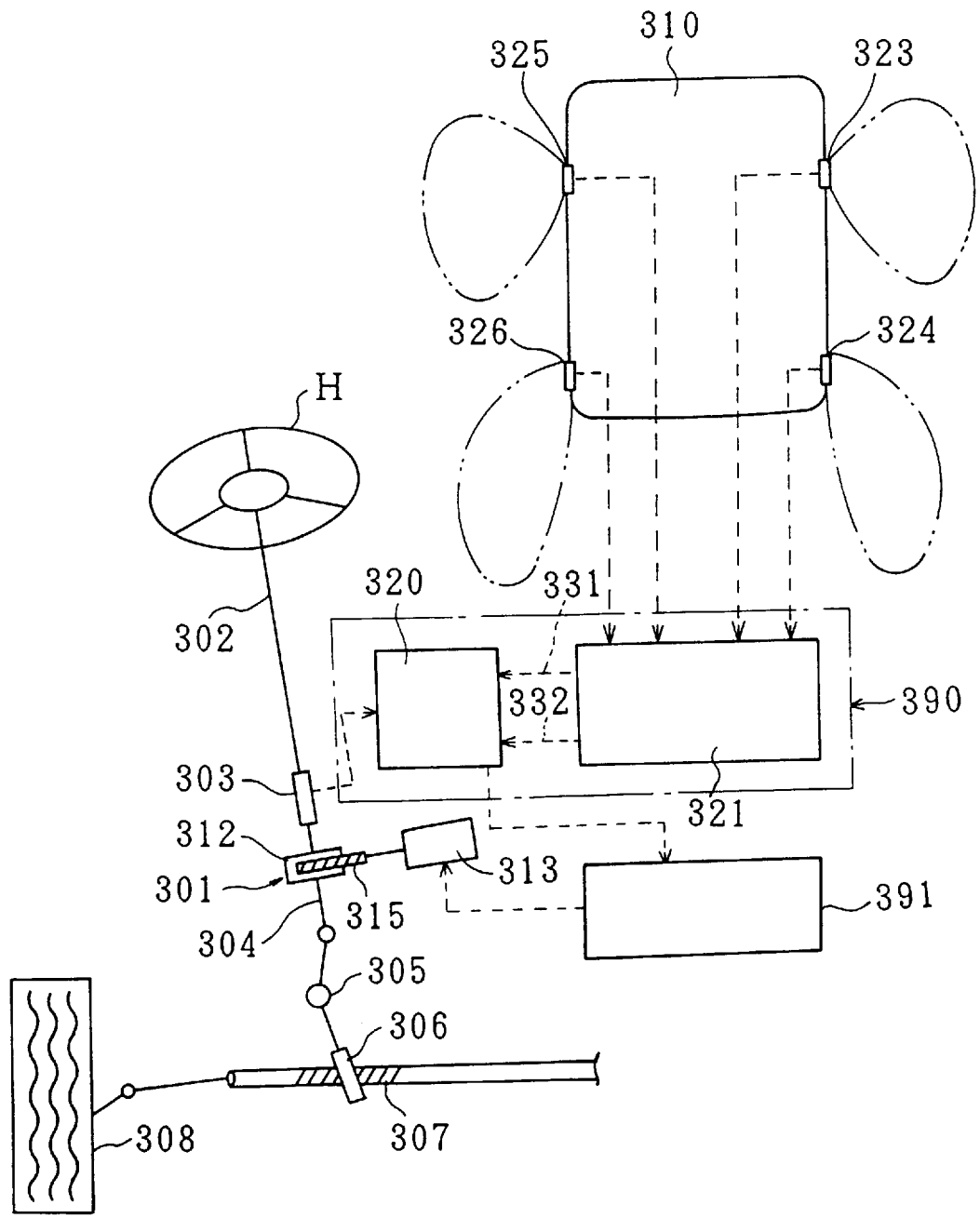
FIG. 14: A schematic diagram illustrating the configuration of the motor operated power steering device of the eighth embodiment of the invention.
Figure 15:
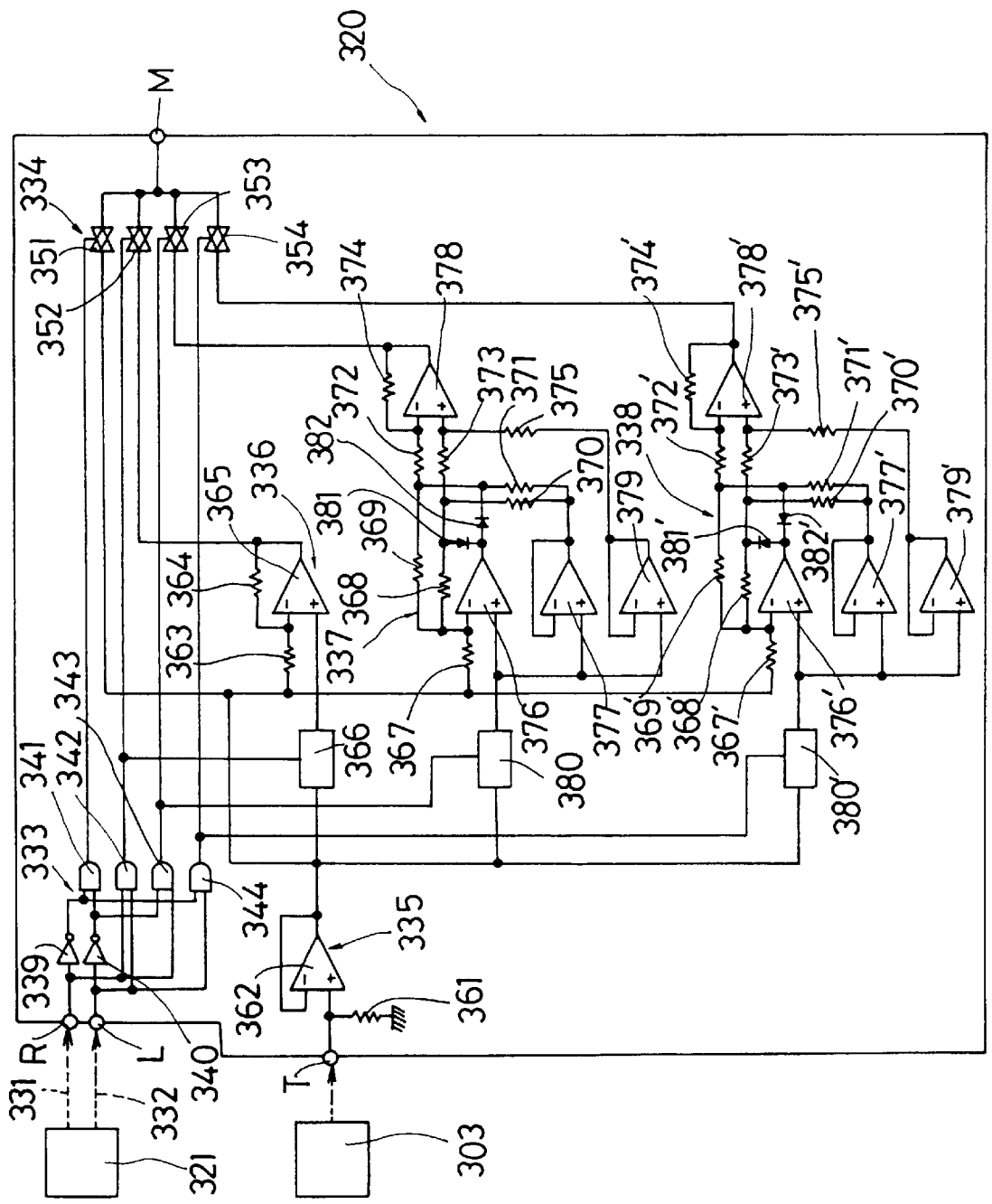
FIG. 15: A schematic representation of the characteristic conversion area of the motor operated power steering device of the eight embodiment of the invention.

The following section contains a description of the eighth embodiment of the present invention by reference to FIGS. 14 to 16.

The rack and pinion motor operated power steering device 301 illustrated in FIG. 14 incorporates an input shaft 302, which is connected to a steering wheel H of the vehicle 310, and an output shaft 304, which is connected to the input shaft 302 by way of a torque sensor 303. The output shaft 304 is connected to a pinion 306 by way of a universal joint 305. A rack 307, which meshes with the pinion 306, is connected to the vehicle's road wheel 308 for steering purposes. The steering torque can thus be transmitted from the steering wheel H by way of the input shaft 302, the torque sensor 303, the output shaft 304 and the pinion 306 to the rack 307. Movement of the rack 307 in response to this transmitted steering torque is used to steer the vehicle 310.

A worm 312 is fitted onto the outer circumference of the output shaft 304. A worm gear 315, which meshes with the worm 312, is connected to an steering assistance power generation motor 313. The torque sensor 303 detects the steering torque, which is transmitted from the input shaft 302 to the output shaft 304.

The torque sensor 303 is connected to a characteristic conversion part 320, which is described in more detail later on. The characteristic conversion part 320 is connected to a steering inhibition source detection device 321. As in the sixth embodiment of the invention outlined above, the steering inhibition source detection device 321 responds to signals received from the plurality of obstacle sensors 323, 324,325,326 fitted to the vehicle 310 by outputting a right steering inhibition source detection signal 331 and a left steering inhibition source detection signal 332 to the characteristic conversion part 320. The characteristic conversion part 320 and the steering inhibition source detection device 321 together make up the safety control unit 390. The characteristic conversion area 320 is connected by way of a steering control unit 391 to the motor 313.

The steering control unit 391 is a circuit which amplifies the signal output from the characteristic conversion part 320 and generates the drive current for the motor 313.

As shown in FIG. 15, the characteristic conversion part 320 incorporates a steering inhibition source determination part 333, a switching part 334, a current-voltage conversion part 335, a left-right characteristic conversion part 336, a right characteristic conversion part 337 and a left characteristic conversion part 338.

The steering inhibition source determination part 333 comprises the first to the fourth logical product circuits 341,342,343,344.

The input terminal R of the right steering inhibition source detection signal 331 is connected indirectly by way of an inverter 339 to the input sides of the first logical product circuit 341 and the fourth logical product circuit 344, and directly to the input sides of the second logical product circuit 342 and the third logical product circuit 343. The input terminal L of the left steering inhibition source detection signal 332 is connected indirectly by way of an inverter 340 to the input sides of the first logical product circuit 341 and the third logical product circuit 343, and directly to the input sides of the second logical product circuit 342 and the fourth logical product circuit 344.

Thus, when there is no output of either the right steering inhibition source detection signal 331 or the left steering inhibition source detection signal 332, the first logical product circuit 341 outputs a high signal, while the other logical product circuits all output a low signal. On the other hand, when both the two steering inhibition source detection signals 331,332 are output, the second logical product circuit 342 outputs a high signal, and the other logical product circuits output a low signal. When only the right steering inhibition source detection signal 331 is output, the third logical product circuit 343 outputs a high signal, and the remaining logical product circuits output a low signal. When only the left steering inhibition source detection signal 332 is output, the fourth logical product circuit 344 outputs a high signal, while the remaining logical product circuits output a low signal.

The switching part 334 comprises the first to the fourth open-close switches 351,352,353,354.

The first open-close switch 351 operates between the current-voltage conversion part 335 and the output terminal M of the steering control unit 391, closing in response to a high signal and opening in response to a low signal from the first logical product circuit 341.

The second open-close switch 352 operates between the left-right characteristic conversion part 336 and the output terminal M, closing in response to a high signal and opening in response to a low signal from the second logical product circuit 342.

The third open-close switch 353 operates between the right characteristic conversion part 337 and the output terminal M, closing in response to a high signal and opening in response to a low signal from the third logical product circuit 343.

The fourth open-close switch 354 operates between the left characteristic conversion part 338 and the output terminal M, closing in response to a high signal and opening in response to a low signal from the fourth logical product circuit 344.

The current-voltage conversion part 335 comprises a resistance 361 and a differential amplifier 362 in order to convert current signals corresponding to the steering torque detected by the torque sensor 303 into voltage signals.

To be more precise, the input terminal T of the torque sensor 303 is earthed by way of the resistance 361. The voltage across the two terminals of the resistance 361 is input to the non-inverting input terminal of the differential amplifier 362. The differential amplifier 362 is subject to negative feedback.

FIG. 16(1) illustrates the relationship between the steering torque and the output of the current-voltage conversion part 335. The relationship is such that the output is increased in line with the steering torque and reaches saturation point when the voltage reaches the level of the power supply voltage.

The left-right characteristic conversion part 336 comprises two resistances 363,364, a differential amplifier 365, and a sample holding circuit 366 in order to convert the output of the current-voltage conversion part 335 either when the vehicle is being steered to the right or else when it is being steered to the left.

To be more precise, the output of the current-voltage conversion part 335 is input to the inverting input terminal of the differential amplifier 365 by way of the resistance 363, and is input to the non-inverting input terminal of the differential amplifier 365 by way of the sample holding circuit 366. The negative feedback circuit of the differential amplifier 365 incorporates the second resistance 364. A high signal output by the aforementioned second logical product circuit 342 acts as a trigger signal for sampling by the sample holding circuit 366.

FIG. 16(2) illustrates the relationship between the steering torque and the output of the left-right characteristic conversion part 336 in the form of a solid line, and illustrates the relationship between the steering torque and the output of the current-voltage conversion part 335 in the form of a broken line. In other words, the left-right characteristic conversion part 336 inverts the output of the current-voltage conversion part 335 by reference to the output S of the sample holding circuit 366 during sampling. The ratio of the change of the inverted output relative to the steering torque can be made to correspond to the value of the resistance 364.

The right characteristic conversion part 337, which converts the output of the current-voltage conversion part 335 only while right steering is being carried out, comprises resistances 367 to 375, differential amplifiers 376 to 379, two diodes 381,382 and a sample holding circuit 380.

To be more precise, the output of the current-voltage conversion part 335 is input to the inverting input terminal of the differential amplifier 376 by way of the resistance 367, and is input to the non-inverting input terminal of the differential amplifier 376 by way of the sample holding circuit 380. The diode 381 and the resistance 368 are connected in series, and the diode 382 and the resistance 369 are connected in series, in each of a pair of feedback circuits which are connected in parallel to the differential amplifier 376. The forward direction of one of the two diode 381.,382 is opposite to that of the other. Intermediate points of the feedback circuits between the diode 381 and the resistance 368 and between the diode 382 and the resistance 369 are connected to the sample holding circuit 380 by way of resistances 370,371 and the differential amplifier 377, which acts as a buffer. One of the intermediate point between the diode 382 and the resistance 369 is connected to the inverting input terminal of the differential amplifier 378 by way of a resistance 372, and the other of the intermediate point between the diode 381 and the resistance 368 is connected to the non-inverting input terminal of the differential amplifier 378 by way of the resistance 373. The negative feedback circuit of the differential amplifier 378 incorporates a resistance 374.

A high signal issued by the aforementioned third logical product circuit 343 acts as a trigger signal for sampling by the sampling holding circuit 380.

The above configuration ensures that, if the output by the current-voltage conversion part 335 exceeds the output by the sampling circuit 380, that is, if the absolute value of the right steering torque signal is larger than that of the right steering signal previously sampled, one diode 381 is switched on and the other diode 382 is switched off, thereby a value corresponding to the output of the current-voltage conversion part 335 is input to the non-inverting input terminal of the differential amplifier 378.

Similarly, if the output by the current-voltage conversion part 335 is less than the output by the sampling circuit 380, that is, if the absolute value of the right steering torque signal is less than that of the right steering torque signal previously sampled, one diode 381 is switched off and the other diode 382 is switched on, thereby a value corresponding to the output of the current-voltage conversion part 335—i.e. a value corresponding to the output value of the torque sensor—is input to the inverting input terminal of the differential amplifier 378. The non-inverting input terminal of the differential amplifier 378 is connected to the sample holding circuit 380 by way of a resistance 375 and another differential amplifier 379, which acts as a buffer.

FIG. 16(3) illustrates the relationship between the steering torque and the output of the right characteristic conversion part 337 in the form of a solid line, and illustrates the relationship between the steering torque and the output of the current-voltage conversion part 335 in the form of a broken line. In other words, the right characteristic conversion part 337 inverts the output of the current-voltage conversion part 335, only when right steering is being carried out by reference to the output S of the sample holding circuit 380. The ratio of the change of the inverted output relative to the steering torque can be made to correspond to the value of the resistance 368.

The left characteristic conversion part 338, which converts the output of the current-voltage conversion part 335 only while left steering is being carried out, comprises resistances 367' to 375', differential amplifiers 376' to 379', two diodes 381',382' and a sample holding circuit 380'. A high signal issued by the aforementioned fourth logical product circuit 344 acts as a trigger signal for sampling by the sampling holder circuit 380'. Otherwise it is configured in exactly the same way as the right characteristic conversion part 337.

The above configuration ensures that, if the output by the current-voltage conversion part 335 exceeds the output by the sampling circuit 380', that is, if the absolute value of the left steering torque signal is larger than that of the left steering torque signal previously sampled, one diode 381' is switched on and the other diode 382' is switched off, thereby a value corresponding to the output of the current-voltage conversion part 335 is input to the non-inverting input terminal of the differential amplifier 378'.

Similarly, if the output by the current-voltage conversion part 335 is less than the output by the sampling circuit 380', that is, if the absolute value of the left steering torque signal is less than that of the left steering signal previously sampled, one diode 381' is switched off and the other diode 382' is switched on, thereby a value corresponding to the output of the current-voltage conversion part 335—i.e. a value corresponding to the output value of the torque sensor—is input to the inverting input terminal of the differential amplifier 378'.

FIG. 16(4) illustrates the relationship between the steering torque and the output of the left characteristic conversion part 338 in the form of a solid line, and illustrates the relationship between the steering torque and the output of the current-voltage conversion part 335 in the form of a broken line. In other words, the left characteristic conversion part 338 inverts the output of the current-voltage conversion part 335, only when left steering is being carried out by reference to the output S of the sample holding circuit 380'. The ratio of the change of the inverted output relative to the steering torque can be made to correspond to the value of the resistance 368'.

In the eighth embodiment of the invention outlined above, the steering device 301 can be switched between the vehicle's steering inhibition application mode and the steering inhibition release mode regardless of whether steering is actually being carried out or not. The degree of the steering inhibition applied is matched with the strength of the driver's steering effort. The steering inhibition is applied only to steering in the direction in which a source calling for the application of steering inhibition is detected.

To be more precise, in the event that neither of the left and right steering inhibition source detection signals 331,332 is being output, the first open-close switch 351 is closed and the second, third and fourth open-close switches 352,353, 354 is opened, thereby ensuring that only the output of the current-voltage conversion part 335 can be output to the steering control unit 391. The steering device 301 is thus put into a mode in which the outputs of the characteristic conversion part 336,337,338 are not output to the steering control unit 391, in other words, a mode in which steering inhibition is not carried out. If the vehicle is steered away from a straight course in this mode,. an output corresponding to the steering torque is applied to the motor 313 by the steering control unit 391. Assistance power corresponding to the steering torque is thus applied to assist the driver in steering the vehicle.

If at least one of the right and left steering inhibition source detection signals 331,332 is output, the first open-close switch 351 is opened and any of the second, third and fourth open-close switches 352,353,354 is closed. The steering device 301 is thus put into a mode in which the output of the current-voltage conversion part 335 does not directly input to the steering control unit 391 and in which the output of any of the characteristic conversion part 336,337,338 can input to the steering control unit 391. In other words, the steering device 301 is switched into a mode in which the application of steering inhibition can be applied only to steering in the direction in which a source calling for steering inhibition is detected. As shown in FIG. 16(2) to 16(4), the degree of steering inhibition increases in line with any increase in steering torque corresponding to the strength of the driver's steering effort.

In the eighth embodiment of the invention, as in the sixth and seventh embodiments of the invention described earlier, the steering device 301 can equally be set such that it can be switched into a steering inhibition release mode in the event that the velocity of the vehicle drops below a preset value or else the driver causes the vehicle to decelerate.

The ninth embodiment of the present invention is described by reference to FIG. 17.

Figure 17:
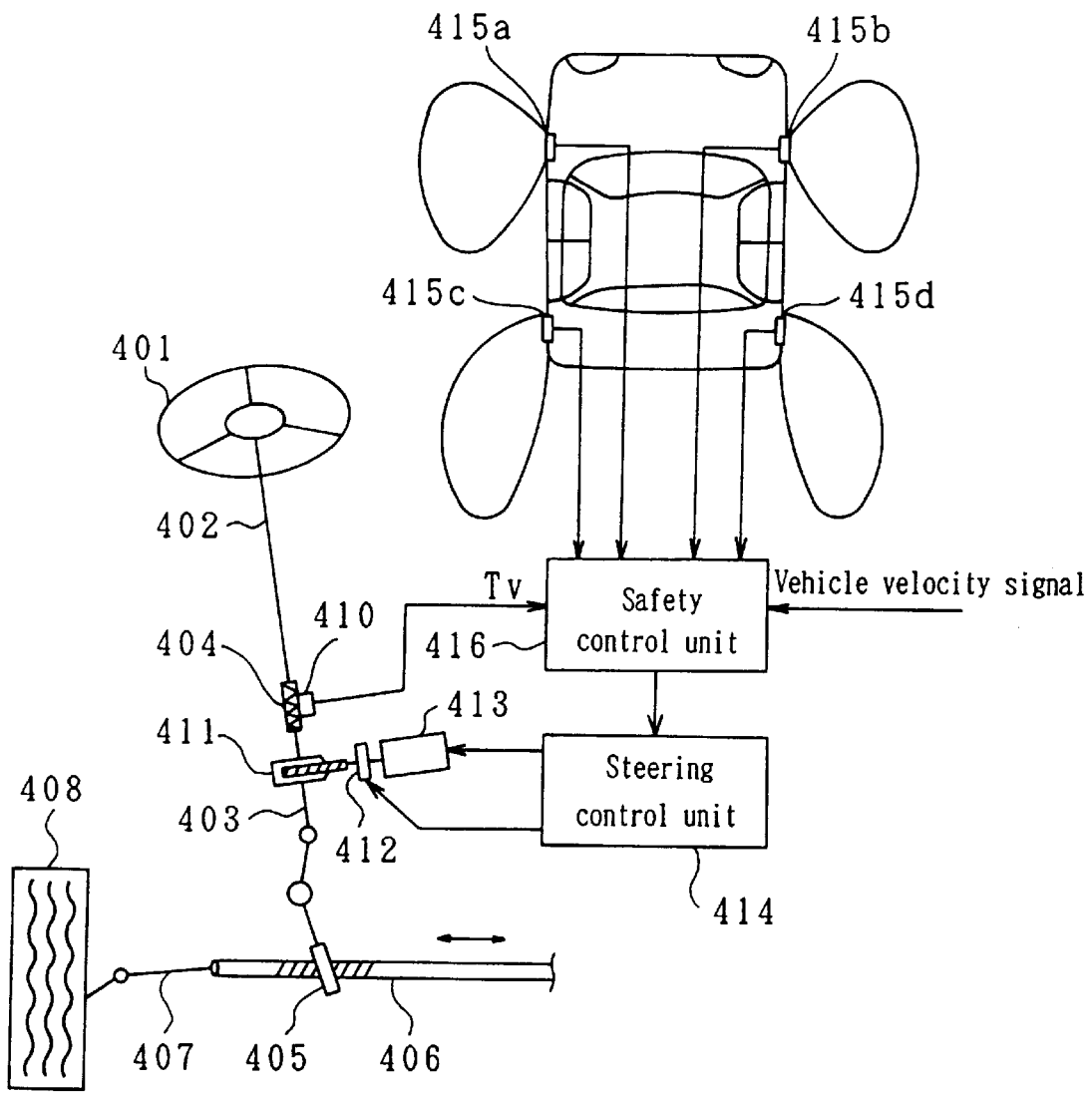
FIG. 17: A schematic diagram illustrating the overall configuration of the motor operated power steering device of the ninth embodiment of the invention.
Figure 18:
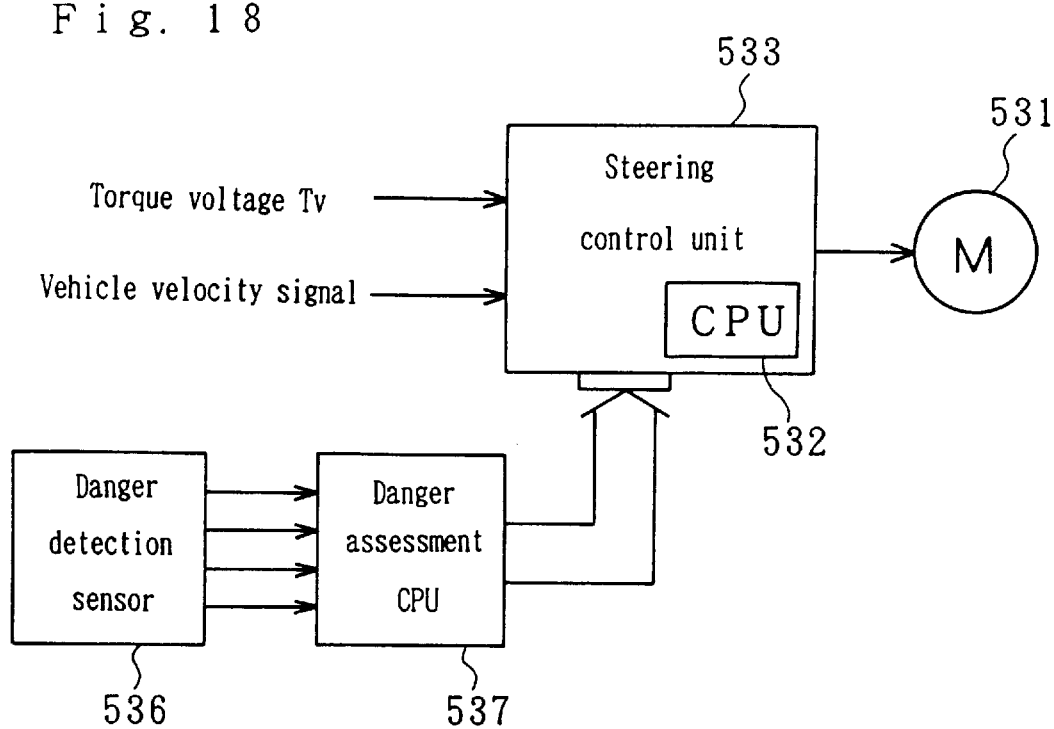
FIG. 18: A schematic representation of the main features of the control circuits of the motor operated steering device.

FIG. 17 illustrates the overall configuration of the ninth embodiment of a motor operated power steering device of the present invention. The overall configuration and operation of the motor operated power steering device of the present embodiment is explained by reference to FIG. 17.

The steering mechanism includes a steering wheel 401, an input shaft 402 connected to the steering wheel 401, and an output shaft 403 that links with the input shaft 402. The input and output shafts 402,403 are linked by way of a torsion bar 404. A pinion gear 405 is connected to the forward end of the output shaft 403. The pinion gear 405 meshes with a rack 406 which extends across the width of the vehicle. The rack 406 is fitted to the tires 408 via tie-rods 407.

For the purpose of providing the vehicle with a steering assistance system, the above steering mechanism incorporates the motor operated power steering device of this embodiment. The motor operated power steering device includes a torque sensor 410, which is set up to operate in relation to the torsion bar 404 as above embodiments, a reduction gear 411, which is engaged with the output shaft 403, a motor 413, which drives the reduction gear 411 through the medium of a clutch 412, a steering control unit 414, which controls the switching of the clutch 412 while at the same time controlling the supply of drive current to the motor 413, and a safety control unit 416, which inputs steering control signals to the steering control unit 414.

The safety control unit 416 receives input signals in the form of torque voltage Tv from the torque sensor 410 and vehicle velocity signals from a vehicle velocity sensor not shown in the drawing. These torque voltage Tv and vehicle velocity signals are used to indicate the vehicle's running mode. The safety control unit 416 also receives input signal from the vehicle's obstacle sensors 415a,415b,415c,415d. These four obstacle sensors 415a to 415d can be located, for example, on each side of the vehicle and on each of the right rear and left rear corners of the vehicle. These sensors output signals whenever the driver's vehicle is approached closely to the side or diagonally to the rear by another vehicle or other potential obstacle. The obstacle sensors 415a to 415d can be any of a number of different types of sensor such as ultrasonic or infrared sensors, which have the capacity to emit ultrasonic or infrared signals and to detect the return of those signals following their reflection by an external obstacle. Alternatively, an image input element such as a CCD can be incorporated in conjunction with an image processing unit. Since any of a number of different known and/or commercially available obstacle sensors can be used for this purpose, we have omitted any further discussion of the precise configuration of the obstacle sensing system from this specification.

When none of the obstacle sensors 415a to 415d are transmitting signals, in other words, when there are no dangerous obstacles in the vicinity of the driver's vehicle, the safety control unit 416 is switched into a steering inhibition release mode. In this mode, the torque voltage Tv signals received from the torque sensor 410 and the vehicle velocity signals are transmitted without modification to the steering control unit 414 for normal steering assistance control. By comparing the torque voltage Tv and vehicle velocity signals with the values in a preset table, the steering control unit 414 read out target control values from the table, and the unit 414 controls the motor 413 by providing control current corresponding to the target control values with the motor 13.

When any of the obstacle sensors 415a to 415d outputs an obstacle detection signal as a danger prediction signal, the safety control unit 416 is switched into a steering inhibition application mode. In this mode, the safety control unit 416 modifies the torque voltage Tv to a prescribed voltage based on the obstacle detection signals received from the obstacle sensors 415a to 415d and the vehicle velocity signals, and outputs the modified voltage value to the steering control unit 414 as modified torque voltage Tv'. The steering control unit 414 uses the modified voltage Tv' and the vehicle velocity signals from the safety control unit 416 to determine a target control current, which is output to control the motor 413.

Table 1 shows how the safety control unit 416 modifies the torque voltage signal Tv, which is treated as a vehicle's running mode signal, in response to the presence or absence of signals from the obstacle sensors 415a to 415d. The signal from each of the obstacle sensors 415a to 415d is treated as a danger prediction signal. For simplicity, the influence of the vehicle velocity signals is eliminated from the table.

TABLE 1

| Torque voltage Tv | No signal from 415a to 415d | Signal from 415a or 415c | Signal from 415b or 415d |
|---|---|---|---|
| a | a | a | −d |
| b | b | b | −c |
| −c | −c | b | −c |
| −d | −d | a | −d |

Here: −d < −c < b < a

In Table 1, the symbols "a", "b", "−c" and "−d" each denote a different voltage value. These values stand in the following relationship to each other: −d<−c<b<a. The torque voltage Tv values "a" and "b" indicate the application of right steering torque, while the values "−c" and "−d" indicate the application of left steering torque.

When the torque voltage Tv value "a" or "b" indicating that the vehicle is being steered to the right is input to the safety control unit 416, if the unit 416 is not in receipt of signals from the obstacle sensors 415a to 415d, the unit 416 retransmits the torque voltage Tv value "a" or "b" on to the steering control unit 414 without modification. Similarly, if the safety control unit 416 is in receipt of obstacle detection signals from the obstacle sensors 415a or 415c, which are fitted to the left of the driver's vehicle, the torque voltage Tv value "a" or "b" is retransmitted to the steering control unit 414 without modification. This is because signals output by obstacle sensors 415a and 415c indicate the approach of a potential obstacle either from the left side or the left rear of the driver's vehicle. If the driver is at this point endeavoring to steer his/her vehicle to the right, then the vehicle is not in any kind of danger. The torque voltage Tv can thus be retransmitted without modification.

When the torque voltage Tv signals "a" or "b" indicating that the vehicle is being steered to the right is input to the safety control unit 416, if the unit 416 is in receipt of signal from the obstacle sensors 415b or 415d, which are fitted to the right side of the driver's vehicle, the torque voltage Tv signals is modified. This is because the driver is starting to steer his/her vehicle to the right despite the presence of an obstacle close to the right side or the right rear of his/her vehicle. The driver's steering to the right is inhibited by locking the steering wheel 401 or by forcing the steering wheel 401 to the left with the motor 413. For this steering inhibition, the torque voltage Tv value "a" is converted to "−d" and "b" is converted to "−c". In other words, the degree of the steering inhibition is matched to the strength of the driver's steering effort.

Again, as shown in Table 1, if the driver's vehicle is being steered to the left, and either there are no signals being received from any of the obstacle sensors 415a to 415d or else there are signals being received only from obstacle sensors 415b or 415d, which are fitted to the right side of the vehicle, the torque voltage Tv is retransmitted without modification. On the other hand, if the driver is trying to steer his/her vehicle to the left and signals are received from obstacle sensor 415a or 415c, which are fitted to the left hand side of the vehicle, the torque voltage Tv is modified to Tv' to cause the steering wheel 401 to be turned back to the right.

The torque voltage Tv' modified by the safety control unit 416 is transmitted to the steering control unit 414. The steering control unit 414 refers to the table shown in Table 2, from which the unit 414 retrieves a suitable target control current ik (k=1 to 9), based on the torque voltage Tv' and vehicle velocity signals, for output to the motor 413. Existing steering control units can thus require no modification for use as the steering control unit 414 of the present embodiment.

TABLE 2

| Torque voltage Tv | Vehicle velocity | | |
|---|---|---|---|
| | $i_1$ | $i_2$ | $i_3$ |
| | $i_4$ | $i_5$ | $i_6$ |
| | $i_7$ | $i_8$ | $i_9$ |

In the ninth embodiment of the present invention, a table including retrievable target control current values is created beforehand, for example, from a set of torque voltage Tv and vehicle velocity signal values as shown in Table 2. The steering control unit 414 has the capacity to read out the target control current value on the basis of the transmitted torque voltage Tv or Tv' and vehicle velocity signals. While, an existing steering control unit 414 need not contain such a preset table. This is because an existing steering control unit 414 can compute a target control current value each time a new torque voltage Tv and a new vehicle velocity signal is transmitted. The present invention can thus be configured using an existing steering control unit 414 without further modification.

The present invention is not limited to the embodiments described above but can be configured in a variety of different ways while still remaining within the scope of the claim. For example, the flow control valves for right and left steering inhibition described in connection with the first to the fifth embodiments can be integrated to each other to form a single unit capable of performing all the functions. Again, the two flow control valves can both be positioned in the fluid channel between the right or left hydraulic fluid chamber and the hydraulic control valve, wherein both flow control valves close the throttling area to restrict the flow of high pressure fluid to the hydraulic actuator when the inhibition of steering to one side is required, and close the throttling area to restrict the flow of low pressure fluid out of the hydraulic actuator when the inhibition of steering to the other side is required. Again, the present invention can be applied to a ball screw type power steering device, as to the rack and pinion power steering device outlined above.

Figure 19:
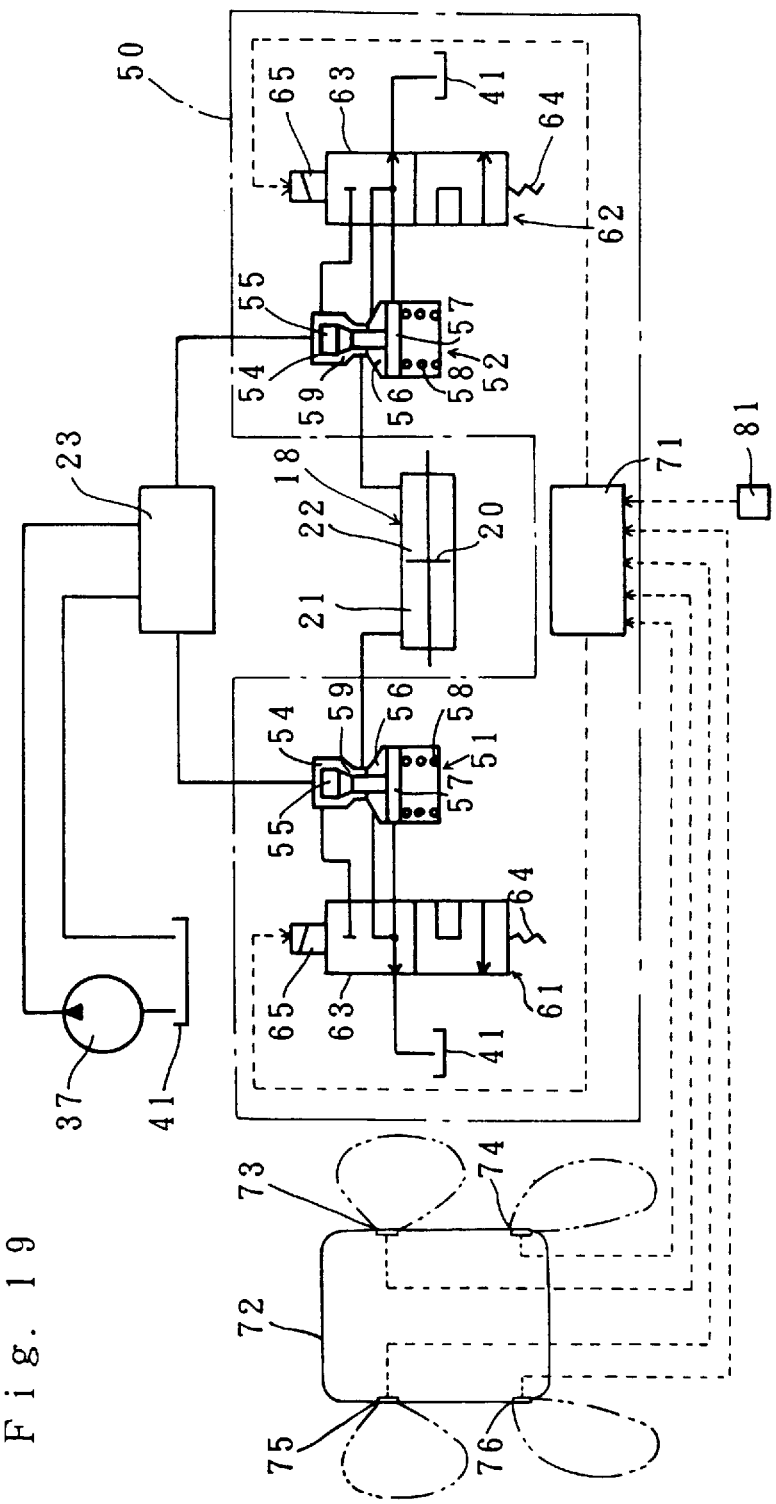
FIG. 19: A schematic diagram illustrating the configuration of a hydraulic power steering device using other technologies.

FIG. 19 illustrates for the purpose of comparison technology which differs in some ways from that of the present invention. The following section describes only areas in which the technology illustrated in FIG. 19 differs from that of the first embodiment of the invention described above. The same numerical labels is applied to all areas in which the technology and the embodiments are identical. First, a torque sensor 81 is used to detect the steering direction by detecting the steering torque transmitted from the input shaft 2 to the output shaft 4. The torque sensor 81 is connected to the controller 71. On receipt of an obstacle detection signal from any of the right obstacle sensors 73,74 and a torque detection signal indicating right steering from the torque sensor 81, the controller 71 amplifies the input signals to generate a solenoid drive current. The solenoid drive current is transmitted as a right steering inhibition signal to the solenoid 65 of the first solenoid switching valve 61. Similarly, on receipt of an obstacle detection signal from any of the left obstacle sensors 75,76 and a torque detection signal indicating left steering from the torque sensor 81, the controller 71 amplifies the input signals to generate a solenoid drive current. The solenoid drive current is transmitted as a left steering inhibition signal to the solenoid 65 of the second solenoid switching valve 62. In other words, the controller 71 outputs the solenoid drive current, which constitutes an amplified input signal, as a steering control signal to the solenoid 65 of whichever of the solenoid switching valves 61,62 corresponding to the steering direction detected by the torque sensor 81.

In this comparative technology, a right steering inhibition signal is issued in response to the detection of a collision obstacle in the right steering direction and the simultaneous detection of right steering. In the same way, a left steering inhibition signal is issued in response to the detection of a collision obstacle in the left steering direction and the simultaneous detection of left steering. In other words, steering inhibition signals are output to each of the flow control valves in response to the receipt of a obstacle detection signal and a steering direction detection signal. The inhibition of steering is thus confined to the direction in which a potential collision obstacle is detected by outputting steering inhibition signals in response to the receipt of both obstacle detection signal and steering direction detection signal, and this simplifies the configuration of the controller which is used to issue the steering inhibition signals. However, there is no way in which this system can be switched between the steering inhibition application mode and the steering inhibition release mode at times when steering is not being carried.

What is claimed is:

1. A vehicle steering device, comprising:
   means for inhibiting the driver's steering;
   means for releasing the steering inhibition;
   means for detecting an obstacle calling for application of steering inhibition;
   means for issuing a signal following detection of the obstacle; and
   means for switching the steering device itself between a first mode in which it is possible to inhibit steering and a second mode in which the steering inhibition is released, in response to issuance and cancellation of the signals, regardless of whether the vehicle is being steered or not.

2. A vehicle steering device, comprising:
   means for inhibiting the driver's steering;
   means for releasing the steering inhibition so that the degree of steering inhibition is matched to the strength of the driver's steering effort;
   means for detecting an obstacle calling for application of steering inhibition;
   means for issuing a signal following detection of the obstacle; and
   means for switching the steering device itself between a first mode in which it is possible to inhibit steering and a second mode in which the steering inhibition is released, in response to issuance and cancellation of the signal, regardless of whether the vehicle is being steered or not.

3. The vehicle steering device according to claim 1, further comprising:
   means for detecting an obstacle calling for the application of steering inhibition in the right steering direction; and
   means for detecting an obstacle calling for the application of steering inhibition in the left steering direction;
   wherein the application of steering inhibition is confined to steering in the direction in which the obstacle is detected.

4. The vehicle steering device according to claim 1, further comprising:
   a vehicle velocity detection means;
   wherein when the vehicle's velocity falls below a preset value, the steering device itself is switched to the second mode in which the steering inhibition is released.

5. The vehicle steering device according to claim 1, further comprising:
   a deceleration operation detection means;
   wherein when a deceleration operation is detected, the steering device itself is switched to the second mode in which the steering inhibition is released.

6. The vehicle steering device according to claim 1, wherein:
   the speed at which the steering inhibition is released is reduced in accordance with the strength of the driver's steering effort.

7. The vehicle steering device according to claim 1, further comprising:
   a hydraulic actuator having a right hydraulic fluid chamber for the generation of steering assistance power to the right and a left hydraulic fluid chamber for the generation of steering assistance power to the left;
   a control valve, which channels high pressure fluid from a pump into one of the hydraulic fluid chambers and drains low pressure fluid from the other hydraulic fluid chamber into a fluid tank, in accordance with the direction of steering and the strength of the driver's steering effort;
   means for detecting an obstacle calling for the application of steering inhibition in the right steering direction;
   means for detecting an obstacle calling for the application of steering inhibition in the left steering direction;
   means for issuing a right steering inhibition signal following the detection of the obstacle calling for the application of steering inhibition in the right steering direction, and issuing a left steering inhibition signal following the detection of the obstacle calling for the application of steering inhibition in the left steering direction; and
   means for applying steering inhibition by high pressure hydraulic fluid supplied via the control valve at a pressure in accordance with the strength of the driver's steering effort, in response to the right and/or left steering inhibition signal.

8. The vehicle steering device according to claim 1, further comprising:
   a hydraulic actuator having a right hydraulic fluid chamber for the generation of steering assistance power to the right and a left hydraulic fluid chamber for the generation of steering assistance power to the left;
   a control valve, which channels high pressure fluid from a pump into one of the hydraulic fluid chambers and drains low pressure fluid from the other hydraulic fluid chamber into a fluid tank, in accordance with the direction of steering;
   means for detecting an obstacle calling for the application of steering inhibition in the right steering direction;
   means for detecting an obstacle calling for the application of steering inhibition in the left steering direction;
   a flow control valve for right steering inhibition located in the hydraulic fluid channel between the hydraulic actuator and the control valve;
   a flow control valve for left steering inhibition located in the hydraulic fluid channel between the hydraulic actuator and the control valve;
   means for issuing a right steering inhibition signal following the detection of the obstacle calling for the application of steering inhibition in the right steering direction, and issuing a left steering inhibition signal following the detection of the obstacle calling for the application of steering inhibition in the left steering direction;
   means for operating the flow control valve for right steering inhibition such that the issue of the right steering inhibition signal results in a reduction in the flow of hydraulic fluid for providing steering assistance power to the right; and
   means for operating the flow control valve for left steering inhibition such that the issue of the left steering inhibition signal results in a reduction in the flow of hydraulic fluid for providing steering assistance power to the left;
   wherein:
   the flow control valve for right steering inhibition is controlled such that it does not cause a reduction in the flow of hydraulic fluid for providing steering assistance power to the left, and the flow control valve for left steering inhibition is controlled such that it does not cause a reduction in the flow of hydraulic fluid for providing steering assistance power to the right.

9. The vehicle steering device according to claim 8, wherein:

the right steering inhibition signal is issued in response to the detection of the obstacle with which the vehicle is in danger of colliding in its right steering direction; and the left steering inhibition signal is issued in response to the detection of the obstacle with which the vehicle is in danger of colliding in its left steering direction.

10. The vehicle steering device according to claim 8, wherein:

when the control valve channels high pressure hydraulic fluid to the hydraulic actuator at a pressure in accordance with the strength of the driver's steering effort, each flow control valve reduces the flow of hydraulic fluid for the generation of steering assistance power in accordance with the pressure of the high pressure hydraulic fluid.

11. The vehicle steering device according to claim 10, wherein:

each of the flow control valves has a pressure sensitive chamber and a valve member that move in accordance with the pressure of the hydraulic fluid in the pressure sensitive chamber;

the means for operating each of the flow control valves has a hydraulic fluid channel switching valve;

each such switching valve connects the pressure sensitive chamber to the high pressure side in response to the steering inhibition signal, and connects the pressure sensitive chamber to the low pressure side by canceling of the steering inhibition signal; and the flow of hydraulic fluid for the generation of steering assistance power is reduced in accordance with the movement of the valve member, which moves in accordance with the pressure in the pressure sensitive chamber.

12. The vehicle steering device according to claim 8, further comprising:

a fluid channel that refluxes the high pressure hydraulic fluid supplied to one or other of the flow control valves to the low pressure side, when the one or other of the flow control valves is in operation and the flow of hydraulic fluid for the generation of steering assistance power is at its lowest.

13. The vehicle steering device according to claim 1, further comprising:

a motor linked to a steering mechanism including a steering wheel, for the generation of steering assistance power when the steering wheel is turned;

a drive control means which determines a target control value in accordance with input signals received and which uses the target control value to drive the motor;

a sensor to detect the vehicle's running mode and issue a running mode signal;

a danger prediction means which outputs a danger prediction signal in response to approach of the vehicle to an obstacle; and a danger avoidance safety control means connected to the sensor, the danger prediction means, and the drive control means;

wherein:

the danger avoidance safety control means output the running mode signal from the sensor to the drive control means without modification when the danger prediction signal from the danger prediction means is absent; and the danger avoidance safety control means modifies the running mode signal from the sensor in accordance with the content of the danger prediction signal and then outputs the modified running mode signal to the drive control means on receipt of the danger prediction signal from the danger prediction means.

14. The vehicle steering device according to claim 13, wherein:

the danger prediction signal indicating the direction of a detected obstacle in relation to the driver's vehicle, and the safety control means converts the running mode signal received from the sensor into an another running mode signal corresponding to the target control value for inhibiting the driver's vehicle from traveling in the direction of the detected obstacle.

* * * * *